United States Patent
Urushihara et al.

(10) Patent No.: US 6,659,068 B2
(45) Date of Patent: Dec. 9, 2003

(54) FEEDBACK CONTROL FOR AUTO-IGNITION TWO-STAGE COMBUSTION OF GASOLINE IN ENGINE CYLINDER

(75) Inventors: Tomonori Urushihara, Yokohama (JP); Koudai Yoshizawa, Kanagawa (JP); Koji Hiraya, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 150 days.

(21) Appl. No.: 09/853,704

(22) Filed: May 14, 2001

(65) Prior Publication Data

US 2001/0045200 A1 Nov. 29, 2001

(30) Foreign Application Priority Data

May 16, 2000 (JP) .......................................... 2000-143850

(51) Int. Cl.$^7$ ................................................. F02B 17/00
(52) U.S. Cl. ........................ 123/295; 123/430; 123/435; 123/299
(58) Field of Search .................... 123/295, 299, 123/305, 435, 430

(56) References Cited

U.S. PATENT DOCUMENTS

| 5,265,574 A | | 11/1993 | Philipp et al. |
| 5,682,856 A | * | 11/1997 | Tomisawa et al. ........... 123/435 |
| 5,881,693 A | * | 3/1999 | Mizuno ...................... 123/295 |
| 6,286,482 B1 | * | 9/2001 | Flynn et al. ................. 123/435 |
| 6,330,510 B1 | * | 12/2001 | Takaku et al. ............... 123/295 |
| 6,354,264 B1 | * | 3/2002 | Iwakiri et al. ............... 123/305 |
| 6,401,688 B2 | | 6/2002 | Teraji et al. ................. 123/295 |

FOREIGN PATENT DOCUMENTS

| DE | 3641 854 A1 | 6/1988 |
| GB | 2 328 980 A | 3/1999 |
| JP | A2 10-196424 | 7/1998 |
| WO | WO 99/06683 | 2/1999 |

OTHER PUBLICATIONS

Stockinger, M. et al., "Versuche an einem gemischansaugenden Verbrennungsmotor mit Selbstzundung", MTZ Motortechnische Zeitschrift, Franckh'Sche Verlagshandlung, Abteilung Technik, Stuttgart, DE, vol. 53, No. 2, Feb. 1, 1992, pp. 80–85.

* cited by examiner

Primary Examiner—Erick Solis
(74) Attorney, Agent, or Firm—Foley & Lardner

(57) ABSTRACT

A split injection of gasoline produces stratified charge in at least one cylinder. A sensor measures cylinder pressure or knock and generates a sensor signal indicative of combustion event timing of stratified charge. From the sensor signal, a controller determines an actual value of a characteristic parameter representing combustion event timing in the cylinder. The controller modifies at least one of operating variables governing a split injection for the subsequent cycle in such a direction as to decrease a deviation between the actual value of the characteristic parameter and a target value thereof toward zero.

27 Claims, 21 Drawing Sheets

1. ADVANCE OF FIRST-STAGE COMBUSTION
2. ELEVATION OF CYLINDER TEMPERATURE
3. ADVANCE OF SECOND-STAGE COMBUSTION
4. ELEVATION OF CYLINDER TEMPERATURE
5. ELEVATION OF CYLINDER WALL TEMPERATURE
6. ELEVATION OF INTAKE AIR TEMPERATURE
7. ADVANCE OF FIRST-STAGE COMBUSTION

FIG.12A PISTON EXHAUST STROKE
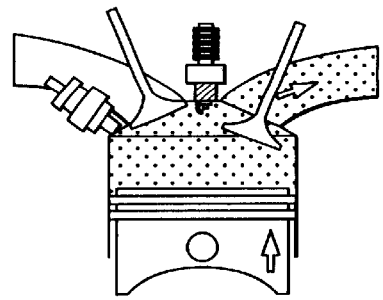
FIG.12B PISTON INTAKE STROKE
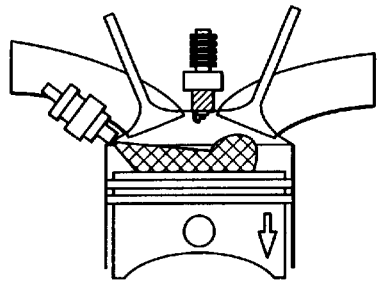
FIG.12C BDC OF PISTON INTAKE STROKE
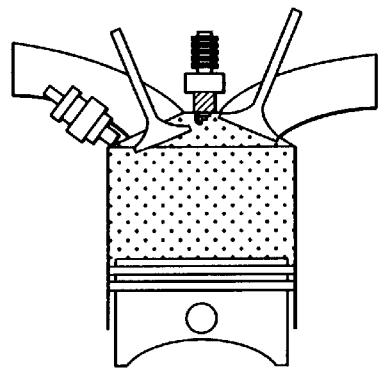
FIG.12D PISTON COMPRESSION STROKE
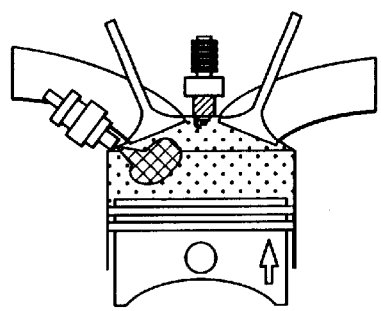
FIG.12E AROUND TDC OF PISTON COMPRESSION STROKE
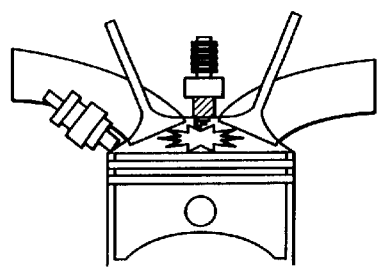

FIG.27

| VARIABLE TO BE CONTROLLED / STATE OF PARAMETER | FIRST PULSE WIDTH Pw1 | FIRST PULSE TIMING I/T1 | SECOND PULSE WIDTH Pw2 | SECOND PULSE TIMING I/T2 |
|---|---|---|---|---|
| dP/dθmax > TARGET | PULSE WIDTH REDUCTION | TIMING ADVANCE | PULSE WIDTH REDUCTION | TIMING ADVANCE |
| Pmax > TARGET | ditto | ditto | ditto | ditto |
| θPmax > TARGET | ditto | ditto | ditto | ditto |
| (AMPLITUDE OF KNOCK CYLINDER VIBRATION) > TARGET | ditto | ditto | ditto | ditto |

US 6,659,068 B2

FEEDBACK CONTROL FOR AUTO-IGNITION TWO-STAGE COMBUSTION OF GASOLINE IN ENGINE CYLINDER

BACKGROUND OF THE INVENTION

1. Field of the Invention

The present invention relates to a system and method for controlling auto-ignition combustion of gasoline in an internal combustion engine, and an auto-ignition type internal combustion engine.

2. Description of Related Art

In auto-ignition combustion of gasoline fuel, burning velocity and/or combustion initiation determine combustion event. JP-A 10-196424 discloses a technique to adjust combustion initiation time at around top dead center (TDC) of exhaust stroke of a piston.

The known technique is satisfactory to some extent, however, involves a potential problem that it would be difficult to suppress cost increase due to additional hardware and avoid additional labor and cost for maintenance of such hardware.

Thus, there would be a need for fine and accurate control of combustion event initiated by auto-ignition without relying on such additional hardware.

SUMMARY OF THE INVENTION

An object of the present invention is to control combustion event initiated by auto-ignition without any additional hardware to a gasoline internal combustion engine.

In one aspect of the present invention, the above object is accomplished by an auto-ignition type internal combustion engine, comprising:

at least one cylinder;

a fuel injection system performing injection of gasoline fuel for one cycle to create stratified charge in the cylinder;

a sensor generating a sensor signal indicative of combustion event timing of the created stratified charge in the cylinder; and an engine controller determining an actual value of a characteristic parameter representing combustion event timing in the cylinder from the sensor signal, and modifying at least one operating variables governing injection for the subsequent cycle in such a direction as to decrease a deviation between the actual value of the characteristic parameter and a target value thereof toward zero.

BRIEF DESCRIPTION OF THE DRAWINGS

The present invention will be more fully appreciated as the same becomes better understood from the following detailed description when considered in connection with the accompanying drawings, in which like reference numerals and characters designate like or corresponding parts through the several views.

FIGS. 12A to 12E are schematic diagrams, illustrating piston exhaust stroke, piston intake stroke, bottom dead center (BDC) of piston intake stroke, piston compression stroke, and around top dead center (TDC) of piston compression stroke, respectively.

FIG. 27 is a table illustrating in what direction operating variables X are to be modified if characteristic parameter Y is greater than a target value (TARGET).

BEST MODES FOR CARRYING OUT THE INVENTION

Figure 2:
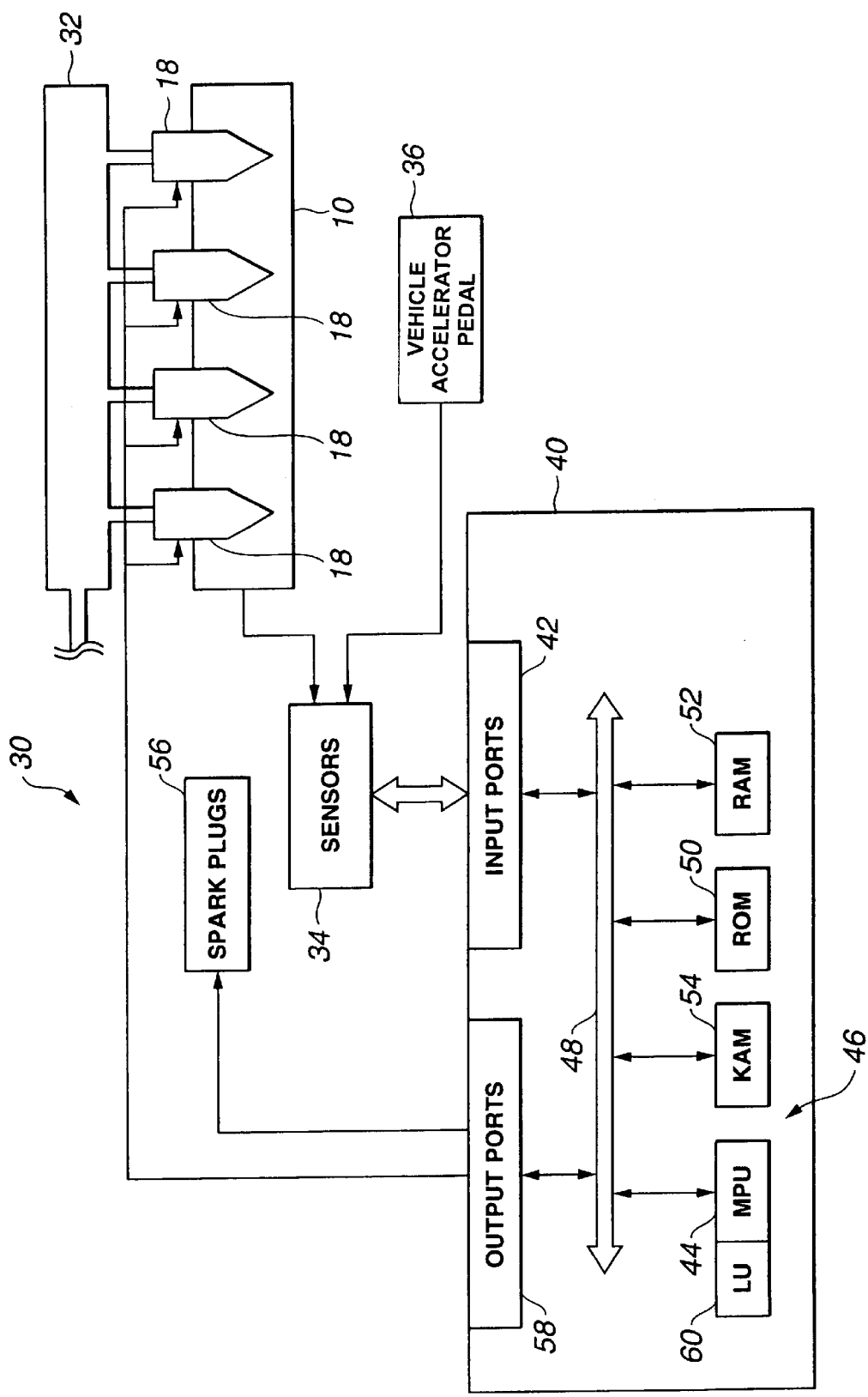
FIG. 2 is a schematic diagram illustrating the system according to the present invention.

Referring now to FIG. 2, a system for controlling an auto-ignition type internal combustion engine is shown. The system, generally indicated by reference numeral 30, includes an engine 10 having a plurality of cylinders each fed by fuel injectors 18. The fuel injectors 18 are shown receiving pressurized gasoline fuel from a supply 32 which is connected to one or more high or low pressure pumps (not shown) as is well known in the art. Alternatively, embodiments of the present invention may employ a plurality of unit pumps (not shown), each pump supplying fuel to one of the injectors 18.

Figure 1:
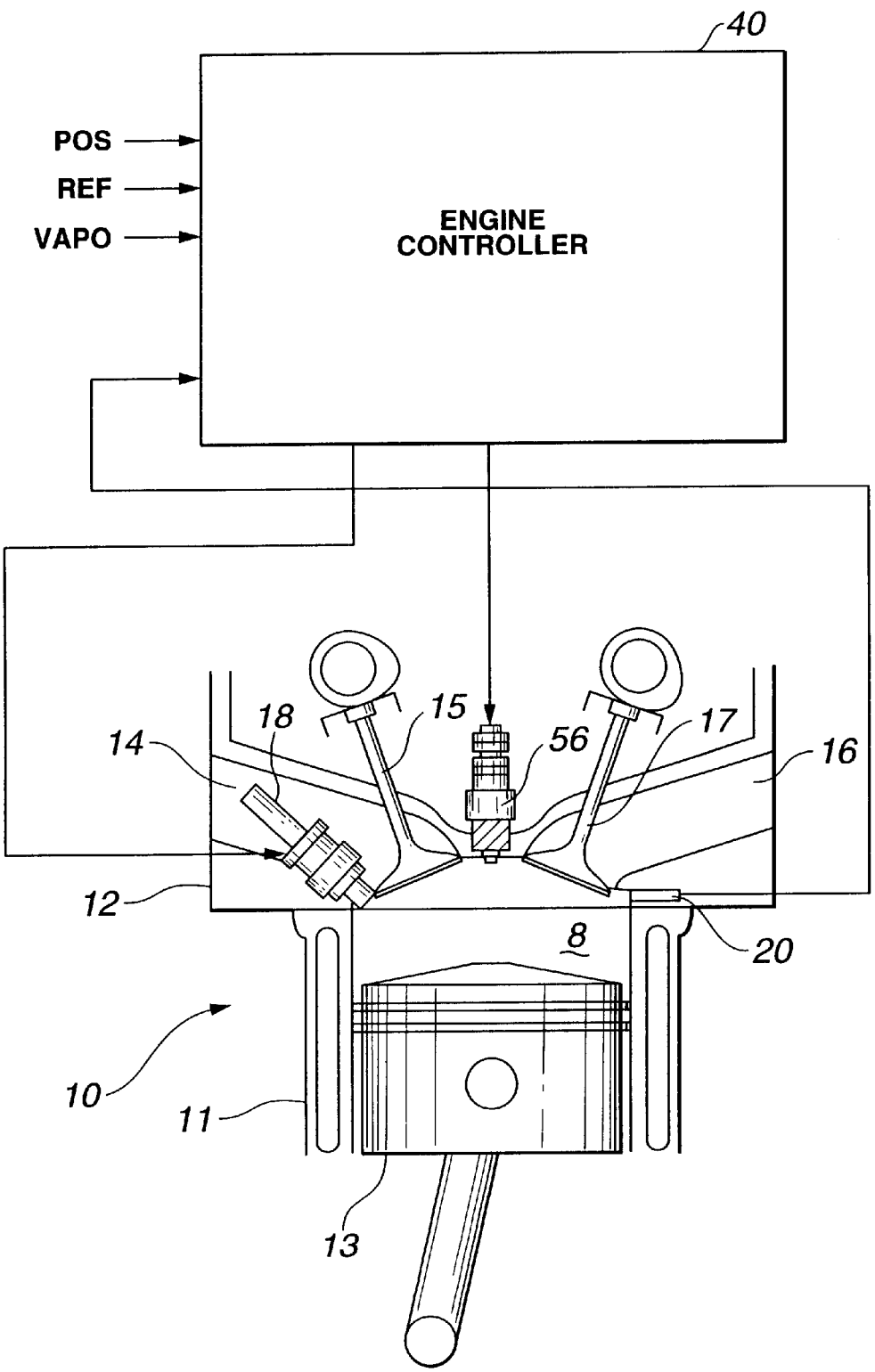
FIG. 1 is a block diagram illustrating an auto-ignition type internal combustion engine, a system and method for controlling an auto-ignition type internal combustion engine according to the present invention.

Referring also to FIG. 1, in a preferred embodiment, engine 10 is a four-stroke cycle internal combustion engine capable of running under auto-ignition combustion of gasoline fuel and under spark-ignition combustion of gasoline fuel as well. The engine 10 includes a cylinder block 11 formed with a plurality of cylinders, only one being shown. A cylinder head 12 is attached to cylinder block 11 and closes the cylinders. As illustrated, each cylinder receives a reciprocating piston 13. The piston 13, cylinder and cylinder head 12 cooperate with each other to define a combustion chamber 8. The cylinder head 12 has two intake ports, only one being shown at 14, and two exhaust ports, only one being shown at 16, communicating with the combustion chamber. Intake and exhaust valves 15 and 17 are provided for admitting fresh air into the combustion chamber and for discharging exhaust gas from the combustion chamber, respectively. Two intake valves 15 close the two intake ports 14, respectively. Two exhaust valves 17 close the exhaust ports 16, respectively. The fuel injectors 18 are mounted to the cylinder head 12, each spraying fuel directly into the combustion chamber in one of the cylinders.

Referring back to FIG. 2, the system 30 may also include various sensors 34 for generating a sensor signal indicative of a combustion event in one of the cylinders, and sensor signals indicative of corresponding operational conditions of engine 10 and other vehicular components. Referring also to FIG. 1, in this preferred embodiment, sensors 34 include a combustion event indicative (CEI) sensor 20, a crankshaft sensor and an accelerator pedal sensor. CEI sensor 20 generates a sensor signal indicative of a combustion event in one of the cylinders. CEI sensor 20 may be a pressure sensor, which detects cylinder pressure in one of the cylinders and generates a sensor signal indicative of variation of cylinder pressure due to combustion of charge in the cylinder. CEI sensor 20 may be a knock sensor, which detects cylinder vibration and generates a sensor signal indicative of an amplitude of cylinder vibration due to combustion of charge in the cylinder. The crankshaft sensor generates a position (POS) signal each time the crankshaft advances through a unit crank angle of 1 degree, and a reference (REF) signal each time the crankshaft advances a predetermined reference crank angle of 180 degrees in the case of four cylinders and 120 degrees in the case of six cylinders. The accelerator pedal sensor is coupled with a vehicle accelerator pedal 36 (see FIG. 2) through which the vehicle operator can express power or torque demand. Accelerator pedal 36 generates a vehicle accelerator pedal opening (VAPO) signal indicative of an opening angle or position of the accelerator pedal 36. The sensors 34 are in electrical communication with an engine controller 40 via input ports 42. Controller 40 preferably includes a microprocessor 44 in communication with various computer readable storage media 46 via data and control bus 48. Computer readable storage media 46 may include any of a number of known devices, which function as a read-only memory (ROM) 50, random access memory (RAM), keep-alive memory (KAM) 54, and the like. The computer readable storage media 46 may be implemented by any of a number of known physical devices capable of storing data representing instructions executable by a computer such as controller 40. Known devices may include, but are not limited to, PROM, EPROM, EEPROM, flash memory, and the like in addition to magnetic, optical, and combination media capable of temporary or permanent data storage.

Computer readable storage media 46 include various program instructions, software, and control logic to effect control of engine 10. Controller 40 receives signals from sensors 34 via input ports 42 and generates output signals that are provided to fuel injectors 18 and spark plugs 56 via output ports 58.

With continuing reference to FIG. 2, a logic unit (LU) 60 determines the type of ignition required: auto-ignition or spark-ignition, and determines the type of fuel injection required: split or single. Logic unit 60 may make such determination by rely on map shown in FIG. 3 using current values of engine speed and load request. If split injection is required for auto-ignition, logic unit 60 adjusts operating variables governing a fuel injection system for creation of stratified charge in each of the cylinders. Referring to FIG. 4, the operating variables include beginning of injection for first injection (BOI_F) I/T1, first pulse width for first injection (FPW_F) Pw1, beginning of injection for second injection (BOI_S) I/T2, and second pulse width for second injection (SPW_S) Pw2. In one embodiment, the second injection is carried out during compression stroke of piston, and the first injection precedes the first injection. Thus, BOI_F and FPW_F are determined such that the first injection is carried out after the completion of exhaust stroke of piston and before BOI_S. Logic unit 60 may be included in the functions of microprocessor 44, or may be implemented in any other inner known elements in the art of hardware and software control systems. It will be appreciated that logic unit 60 may be a part of controller 40, or may be an independent control unit that is in communication with controller 40.

As will be appreciated by one of ordinary skilled in the art, the control logic may be implemented in hardware, or a combination of hardware and software. The various functions are preferably carried out by a programmed microprocessor, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine. Likewise, parallel processing or multi-tasking systems may be used. The present invention is independent of the particular programming language, operating system, or processor used to implement the control logic illustrated.

Figure 5:
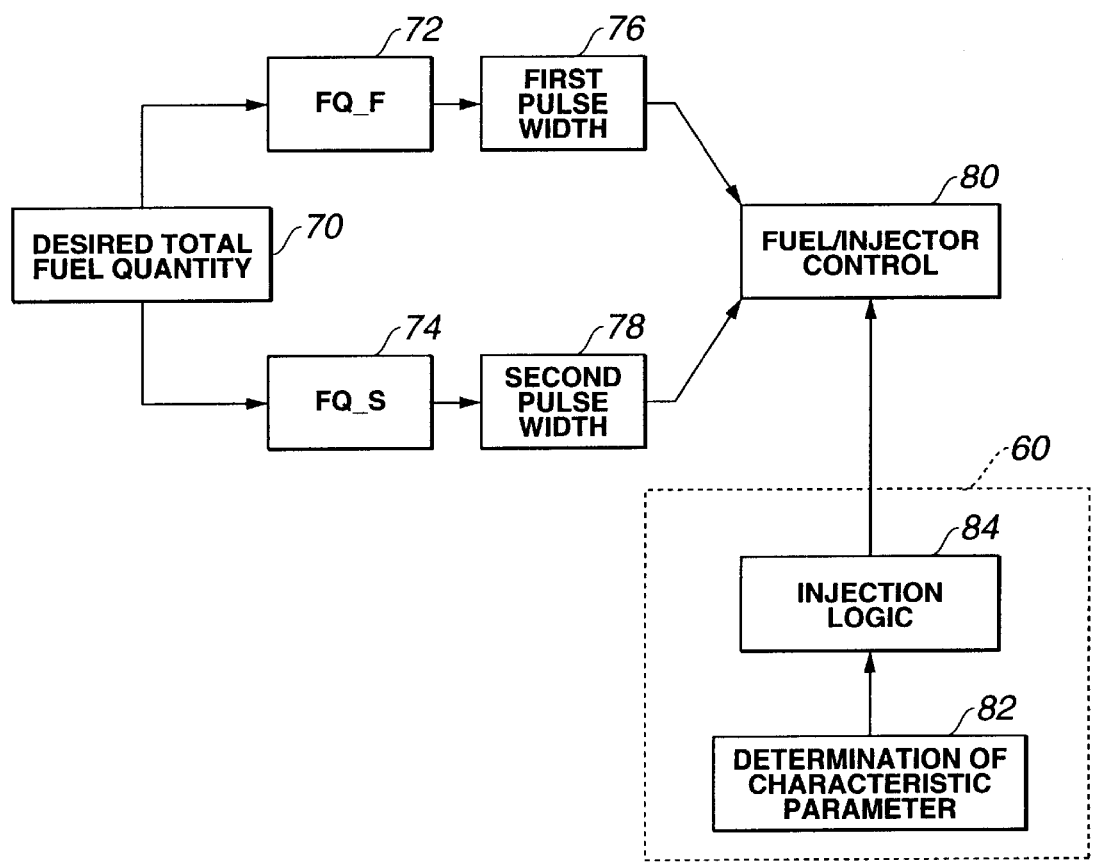
FIG. 5 is a functional block diagram illustrating a fuel delivery control.
Figure 8:
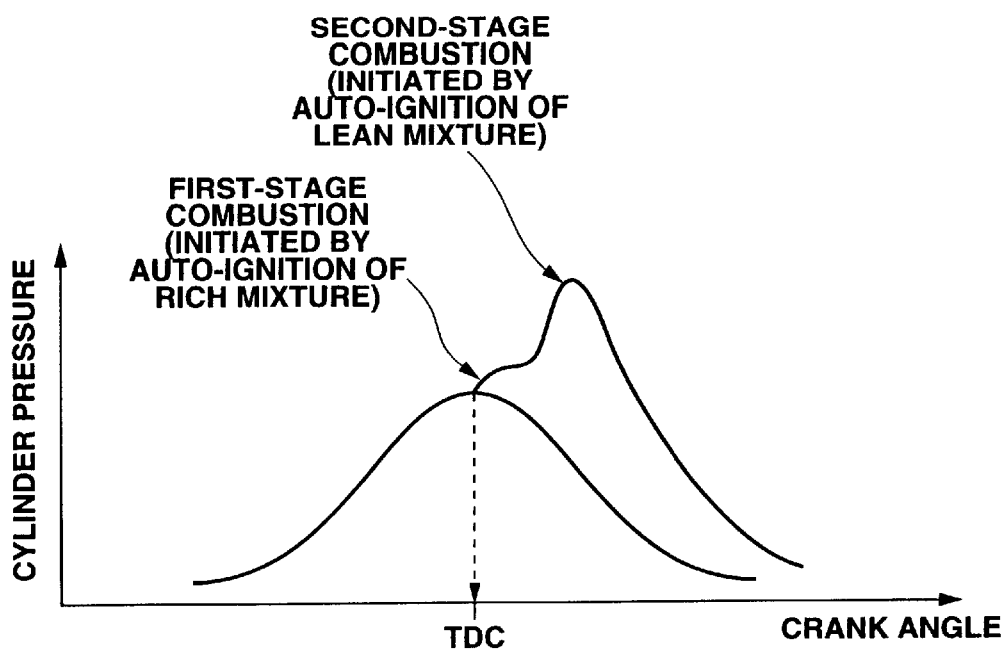
FIG. 8 is a pressure diagram of auto-ignition combustion of stratified charge.

Referring to FIG. 5, a functional block diagram illustrates a fuel delivery control for a split injection. Split injection is the delivering of fuel in two discrete quantities. A desired engine torque is determined based on various operating conditions such as engine speed (rpm), vehicle accelerator pedal opening (VAPO), and transmission ratio. Engine speed may be determined based on POS signal generated by the crankshaft sensor. Desired engine torque may be determined based on VAPO signal and engine speed. Alternatively, percent load could be used for the purpose of system control instead of engine torque. A desired total fuel quantity or fuel quantity per cycle 70 is determined based on the desired engine torque or the engine load. The desired total fuel quantity is divided into fuel quantity for first injection FQ_F 72 and fuel quantity for second injection FQ_S 74.

The quantity of fuel for each injection is represented by a fuel pulse width. FPW 76 corresponds to the value of FQ_W 72, while SPW 78 corresponds to the value of FQ_S 74.

Fuel injector control 80 initiates and terminates the first and second injections, and communicates with logic control 60 to control fuel injection. Logic unit 60 cooperates with fuel injector control to precisely control a beginning of each injection, BOI_F and BOI_S. For further understanding of configuration for split injection and fuel delivery control, reference is made to U.S. Pat. No. 6,401,688, the disclosure of which is hereby incorporated by reference in its entirety.

Figure 3:
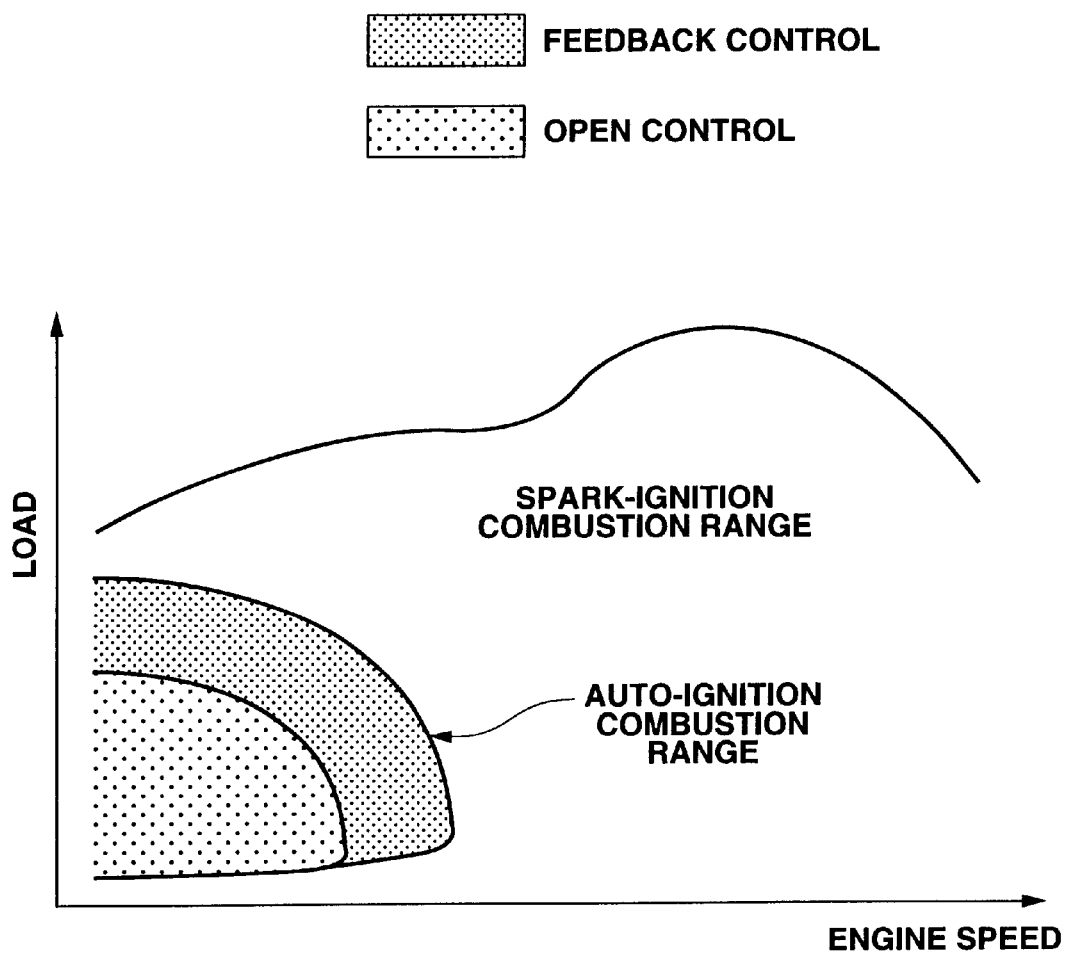
FIG. 3 is a combustion type map.
Figure 4:
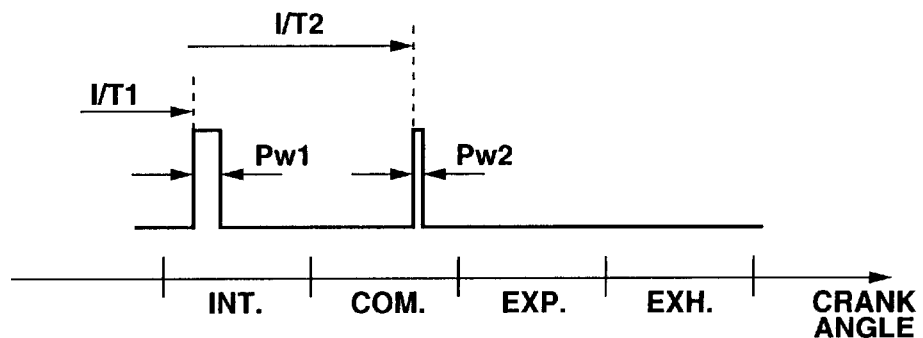
FIG. 4 is a schematic timing diagram illustrating pulses for a split injection.

In the map of FIG. 3, an auto-ignition combustion range for part load is show as well as a spark ignition combustion range for full load. Logic unit 60 disables split injection and enables single injection for spark ignition combustion. If single injection is required, FQ_F 72 equals desired total fuel quantity 70, and FQ_S 74 equals zero. Logic unit 60 enables split injection and disables single injection for auto-ignition combustion. The auto-ignition combustion range is divided into an open control (or open loop control) section and a feedback control (or closed loop control) section. In open control section, control logic 60 adjusts operating variables governing split injection in response to operating conditions for creation of stratified charge to cause auto-ignition around top dead center (TDC) position of compression stroke of piston. In feedback control section, sensor signal from CEI sensor 20 is processed to determine an actual value of characteristic parameter representing combustion event of stratified charge in cylinder at block 82 (see FIG. 5). Injection logic 84 modifies at least one of operating variables, namely, BOI_F I/T1, FPW_F Pw1, BOI_S I/T2, and SPW_S Pw2, in such a direction as to decrease a deviation between the actual value of the characteristic parameter and a target value thereof toward zero.

The target value may be found in a look-up table versus operating conditions. CEI sensor 20 may be a pressure sensor to detect cylinder pressure in cylinder. A semiconductor pressure sensor may be used. A knock sensor may be used as CEI sensor 20. The knock sensor can detect cylinder vibration.

In one embodiment, CEI sensor 20 is a pressure sensor that generates a sensor signal indicative of cylinder pressure, and characteristic parameter is the maximum of cylinder pressure elevation rate $dP/d\ \theta_{max}$, where P is cylinder pressure and $\theta$ is crank angle. In another embodiment, characteristic parameter is the maximum of cylinder pressure $P_{max}$. In further embodiment, characteristic parameter is a crank position at which cylinder pressure hits the maximum $\theta P_{max}$. In still further embodiment, CEI sensor 20 is a pressure sensor that generates a sensor signal indicative of cylinder pressure, and characteristic parameter is amplitude of cylinder pressure. In still another embodiment, CEI sensor 20 is a knock sensor that generates a sensor signal indicative of cylinder vibration, and characteristic parameter is amplitude of cylinder vibration.

Figure 6:
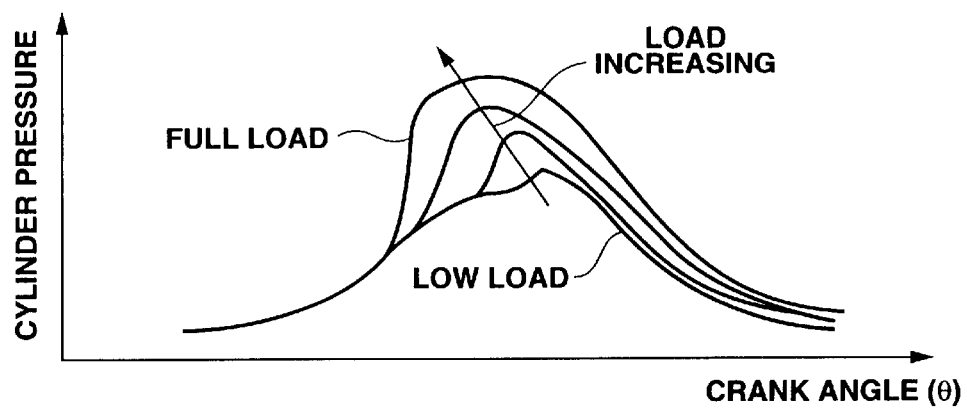
FIG. 6 is a pressure diagram of auto-ignition combustion of homogeneous charge.
Figure 7:
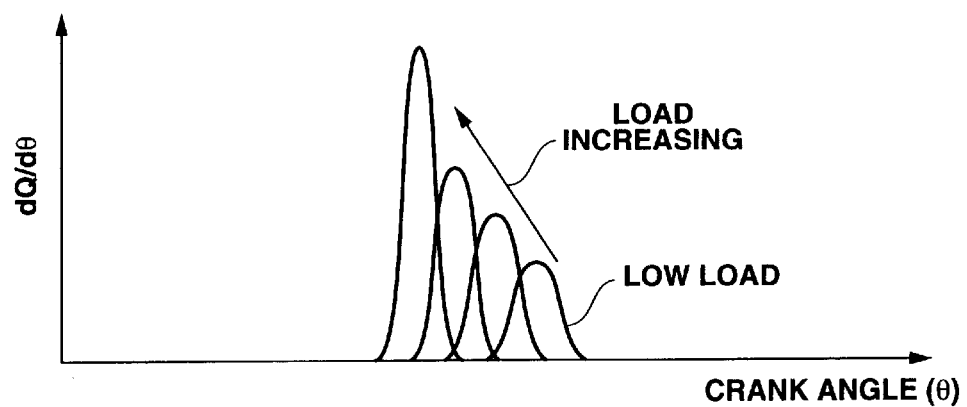
FIG. 7 is a heat diagram of the auto-ignition combustion of homogeneous charge.

Referring to FIGS. 6 and 7, combustion in auto-ignition of homogeneous charge is considered. FIG. 6 shows pressure diagram for auto-ignition combustion of homogeneous charge, illustrating four combustion events with different magnitudes of engine load from low load toward full load. FIG. 7 shows heat diagram illustrating the four combustion events. Fuel quantity for injection is controlled to meet varying engine load request.

Increasing fuel quantity to meet load request causes an increase in amount of heat generated by combustion. Besides, a drop in A/F causes an increase in chemical reaction speed between fuel and air, thereby to reduce period of combustion and advance beginning of generation of heat.

Increase in total amount of heat generated, reduction in period of combustion, and advance in beginning of generation of heat are combined with each other to bring about an increase in the value of the maximum of cylinder pressure elevation rate $dP/d\ \theta_{max}$ and an increase in the value of the maximum of cylinder pressure $P_{max}$ as load increases. Accordingly, an allowable level of combustion noise, which is determined by the type of vehicles in which the engine is installed, and mechanical strength of the engine determine an upper limit of load with which stable auto-ignition combustion may be accomplished. Raising cylinder pressure elevation rate $dP/d\ \theta$ also increases susceptibility to cylinder pressure fluctuation like knocking, thereby to raise the level of combustion noise.

The before-mentioned incorporated U.S. patent application Ser. No. 09/769,365 teaches split injection to create stratified charge, thereby to accomplish so-called "two-stage combustion." The two-stage combustion has a potential for independent control of beginning of heat generation from load, which has never been realized within high load section of part load.

Figures 9A, 9B, 9C:
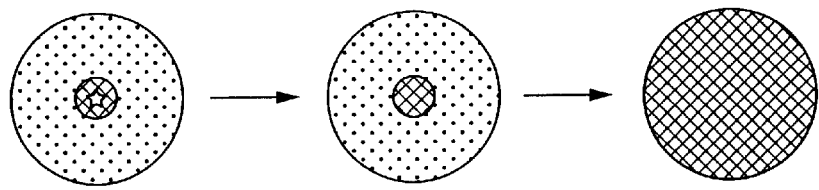
FIGS. 9A, 9B, and 9C are schematic diagrams illustrating an ignition of a central rich mixture portion, combustion of the rich mixture portion, and ignition of the surrounding lean mixture portion.

Referring to FIG. 8, and FIGS. 9A–9C, FIG. 8 provides a cylinder pressure diagram of one cycle of two-stage combustion, and FIGS. 9A, 9B, and 9C provide schematic cross sections of a cylinder, illustrating ignition of rich mixture portion, combustion of the rich mixture portion, and ignition of the surrounding lean mixture portion, respectively.

According to two-stage combustion, auto-ignition of rich mixture portion at around TDC of compression stroke of piston is easy to accomplish because temperature rises to the maximum level there. This ignition initiates the first-stage combustion. This first-stage combustion occurring at around the TDC causes occurrence of the subsequent second-stage combustion of lean mixture portion after the TDC.

Figures 10, 11:
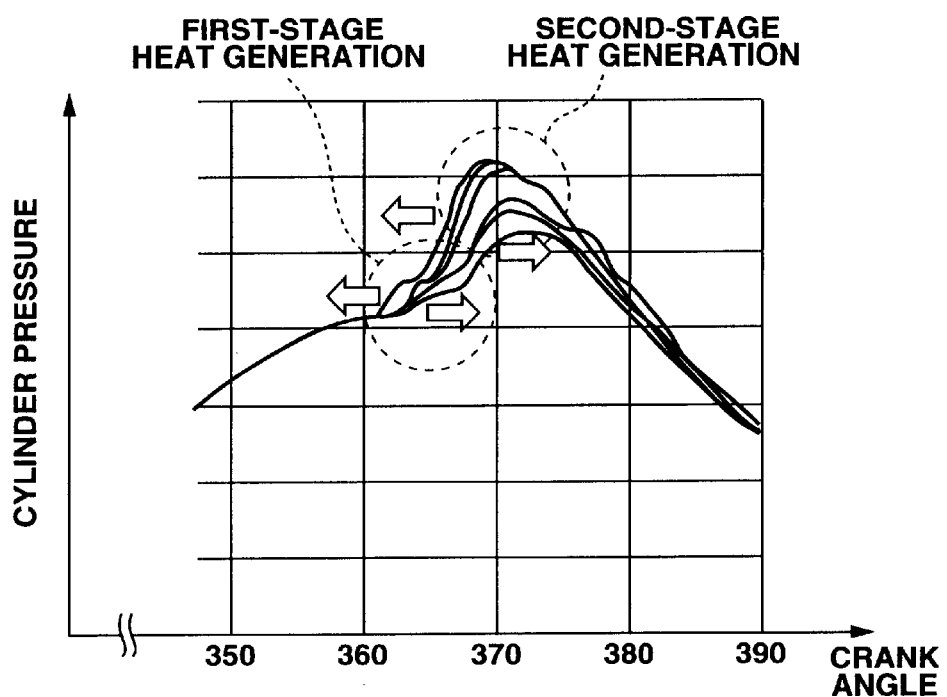
FIG. 10 is a pressure diagram illustrating six combustion cycles.
FIG. 11 illustrates a series of processes in combustion cycle.

FIG. 10 is a pressure diagram illustrating a problem to be solved before accomplishing independent control of beginning of heat generation from load. In FIG. 10, variation of cylinder pressure due to two-stage combustion is illustrated over six consecutive combustion cycles. As readily seen from a group of six pressure curves, beginning of first-stage combustion, which occurs around crank angle of 360°, and beginning of second-stage combustion, which occurs around crank angle of 370° tend to move in one direction over the consecutive cycles Accordingly, stable two-stage combustion cannot be expected within relatively high load range section of part load.

FIG. 11 illustrates a series of processes in combustion cycle, illustrating what causes a lack of stability in controlling beginning of second-stage combustion by adjusting stratification of mixture charge.

1. Advance of first-stage combustion: It is assumed now that some causes an advance of first-stage combustion of rich mixture portion.
2. Elevation of cylinder temperature: The advance of first-stage combustion causes an elevation of cylinder temperature.
3. Advance of second-stage combustion: The elevation of cylinder temperature causes an advance of second-stage combustion of lean mixture portion.
4. Elevation of cylinder temperature: The advance of second-stage combustion causes a further elevation of cylinder temperature.
5. Elevation of cylinder wall temperature: The further elevation of cylinder temperature causes an elevation of cylinder wall temperature.
6. Elevation of intake air temperature: The elevation of cylinder wall temperature causes an elevation of intake air temperature.
7. Advance of first-stage combustion: The elevation of intake air temperature causes a further advance of first-stage combustion.

Accordingly, if some causes an advance of first-stage combustion in one cycle, a further advance of first-stage combustion takes place in the subsequent cycle. Similarly, if some causes a retard of first-stage combustion in one cycle, a further retard of first stage-combustion takes place in the subsequent cycle.

FIGS. 12A to 12E illustrates split injection of gasoline during part load to create stratified charge for accomplishing two-stage combustion by auto-ignition. FIG. 12A shows piston exhaust stroke, and FIG. 12B shows an initial part of piston intake stroke. In one embodiment, first injection of gasoline begins during piston intake stroke as shown in FIG. 12B. Gasoline fuel sprayed by first injection diffuses widely past BDC of piston intake stroke as shown in FIG. 12C, thereby to create homogeneous relatively lean mixture during piston compression stroke as shown in FIG. 12D. Second injection of gasoline begins during piston compression stroke as shown in FIG. 12D. Gasoline fuel sprayed by second injection overlies a portion of the homogeneous relatively lean mixture, creating relatively rich mixture at the portion.

BOI_S (Beginning Of Injection of Second injection) mainly determines volume of the relatively rich mixture portion. If BOI_S is advanced with respect to TDC of piston compression stroke, gasoline fuel sprayed by second injection diffuses widely until piston reaches TDC. If BOI_S is less advanced with respect to TDC position of piston compression stroke, gasoline fuel sprayed by second injection diffuses less widely until piston reaches TDC. Accordingly, volume of relatively rich mixture portion is less with less advanced BOI_S than volume of relatively rich mixture portion with advanced BOI_S.

FQ_F (Fuel Quantity for First injection), FQ_S (Fuel Quantity for Second injection), and BOI_S determine A/F of relatively rich mixture portion.

A/F of relatively rich mixture portion determines beginning of first-stage combustion or beginning of auto-ignition of relatively rich mixture portion.

Product of equivalence ratio of relatively rich mixture portion and volume thereof determines amount of heat generated by first-stage combustion.

It will be appreciated that amount of heat generated by first-stage combustion and beginning of generation of heat by the first-stage combustion are determined as a function of operating variables BOI_F, FQ_F, BOI_S, and FQ_S of first and second injections.

Figure 13:
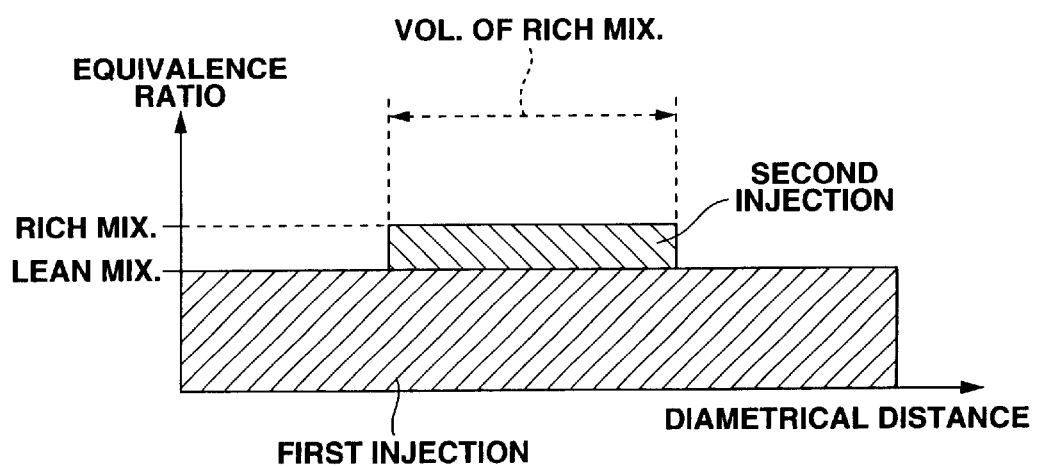
FIG. 13 is a graphical representation of stratified charge within a cylinder including relatively lean mixture due to first injection and relatively rich mixture due to second injection.

FIG. 13 is a graphical representation of stratified charge created in cylinder by split injection of gasoline, first during intake stroke of piston, second during compression stroke of piston. Since gasoline is sprayed along the center axis of cylinder and diffused outwardly toward the cylinder wall, relatively rich mixture due to second injection is located around the cylinder axis and within relatively lean mixture due to first injection. In FIG. 13, the horizontal axis represents the diametrical distance from a portion of cylinder wall to the diametrically opposite portion thereof, while the vertical axis represents equivalence ratio.

Figure 14:
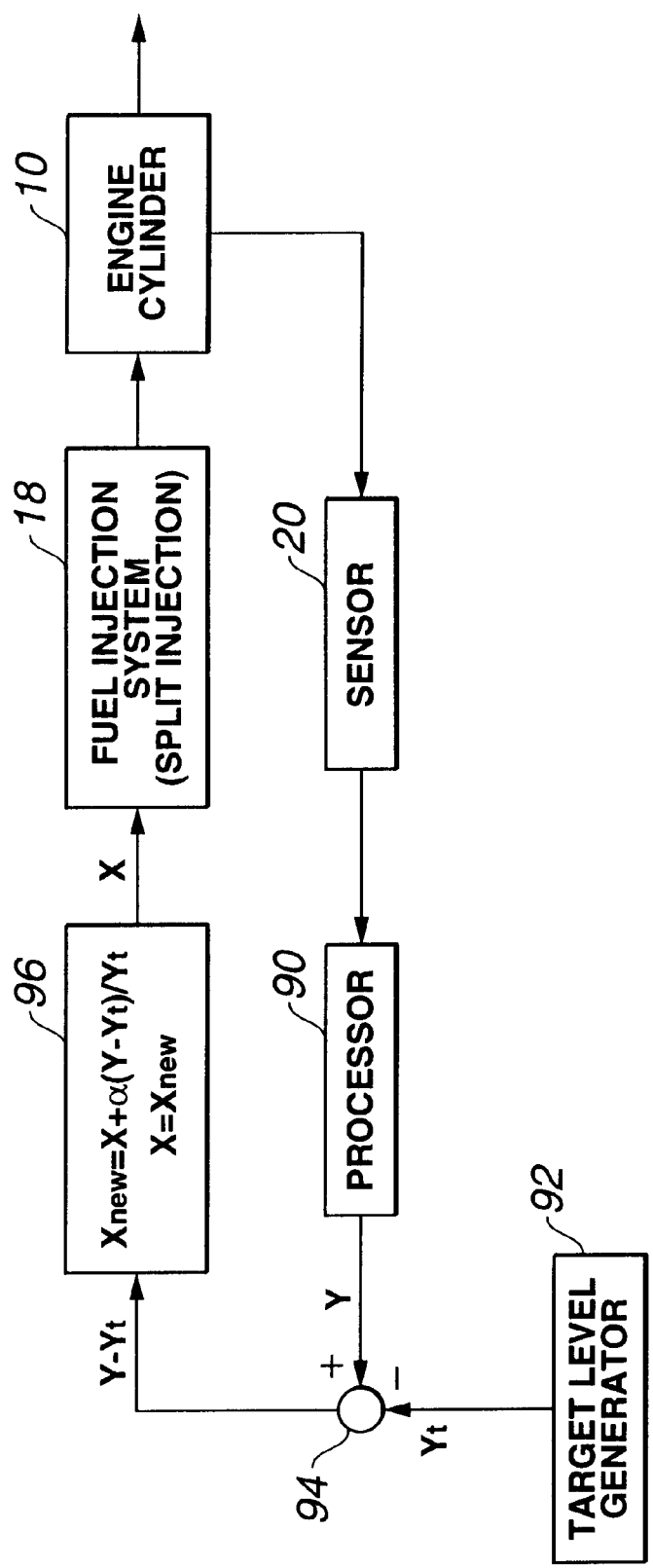
FIG. 14 is a schematic diagram of a feedback control system according to the present invention.

From the preceding description, it will be understood why open loop control of two-stage combustion is inappropriate within high load section of part load. Accordingly, during operating conditions as illustrated by condensed dotted area in FIG. 3, a feedback control as illustrated in FIG. 14. Feedback control is employed to settle beginning of generation of heat by first-stage combustion. Beginning of generation of heat by first-stage combustion determines beginning of generation of heat by second-stage combustion, which may be referred hereinafter by main combustion. Cylinder pressure in cylinder of engine 10 is monitored by CEI sensor 20. Pressure wave produced by combustion event of two-stage combustion may be characterized or represented by characteristic parameter generally designated by the reference character Y. Characteristic parameter Y includes (1) the maximum of cylinder pressure elevation rate $dP/d\theta_{max}$, (2) the maximum of cylinder pressure $P_{max}$, (3) crank position at which cylinder pressure hits the maximum $\theta P_{max}$, and (4) amplitude of cylinder pressure fluctuation or cylinder vibration. Characteristic parameter Y is not limited to these examples and mat take any other variable representing combustion event timing. After completion of or during one cycle of combustion, sensor signal from sensor 20 indicative of combustion event timing is processed at block 90 to provide an actual value of characteristic parameter Y. A target level or value Yt of characteristic parameter Y may be found in a look-up table versus operating conditions. In FIG. 14, the target value Yt of characteristic parameter Y is provided by a generator block 92. At summation block 94, a deviation between the actual value Y and the target value Yt is calculated. The deviation, Y−Yt, is fed to a modifier block 96. In FIG. 14, the reference character X generally designates at least one of operating variables governing fuel injection system capable of performing split injection. The governing operating variables include (1) BOI_F (Beginning Of Injection for First injection), (2) FQ_F (Fuel Quantity for First injection), (3) BOI_S (Beginning Of Injection for Second injection), and (4) FQ_S (Fuel Quantity for Second injection). The operating variables are not limited to these examples and may include any other variable, which has an influence of A/F or volume of relatively rich mixture. A split ratio between FQ_F and FQ_S may be regarded as one of such operating variables. Using the split ratio is advantageous in that A/F of relatively rich mixture can be varied without any variation in desired total fuel quantity that is determined by load request. At block 96, operating variable X is modified using the deviation Y−Yt by calculating the following equations:

$$X_{new} = X + \alpha(Y-Yt)/Yt \qquad \text{Eq. 1,}$$

$$X = X_{new} \qquad \text{Eq. 2,}$$

where a is a feedback coefficient that may be determined after experiments to meet two incompatible requests, one for quick control response, the other for control stability. Modifier block 96 provides, it the operating variable X as modified to fuel injection system 18. From the description, it will now be appreciated that A/F or volume of relatively rich mixture portion can be controllably varied by modifying at least one of governing operating variables in such a direction as to decrease a deviation Y–Yt toward zero.

Figure 15:
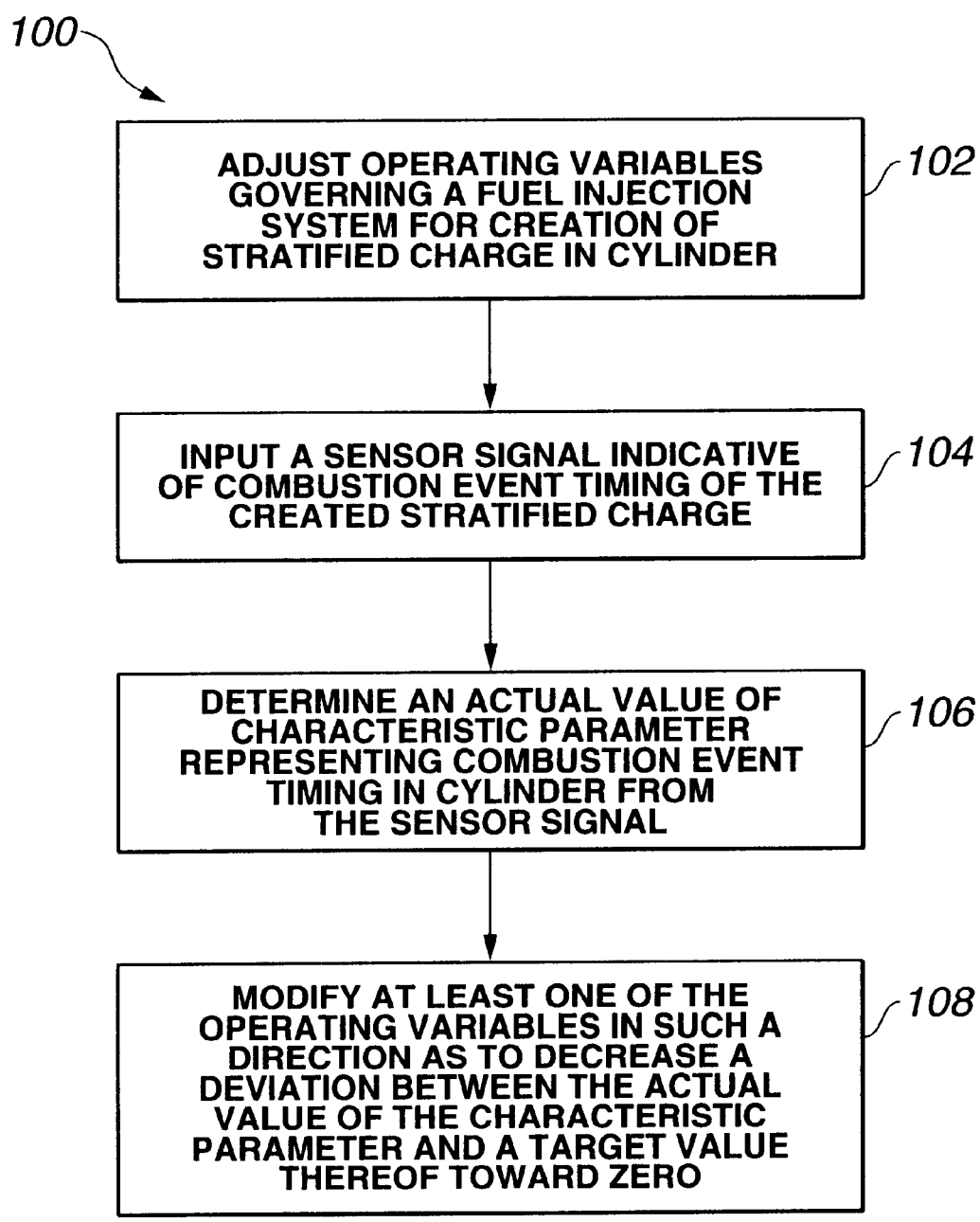
FIG. 15 is a block diagram illustrating a method of the present invention for controlling auto-ignition combustion of gasoline in cylinder.

With reference to FIG. 15, a method of the present invention for controlling auto-ignition combustion of gasoline in cylinder is generally designated at 100. At block 102, operating variables governing a fuel injection system are adjusted for creation of stratified charge in cylinder. At block 104, a sensor signal indicative of combustion event timing of the created stratified charge is input. At block 106, an actual value of characteristic parameter representing combustion event timing in cylinder is determined from the sensor signal. At block 108, at least one of the operating variables is modified in such a direction as to decrease a deviation between the actual value of the characteristic parameter and a target value thereof toward zero.

Figure 16:
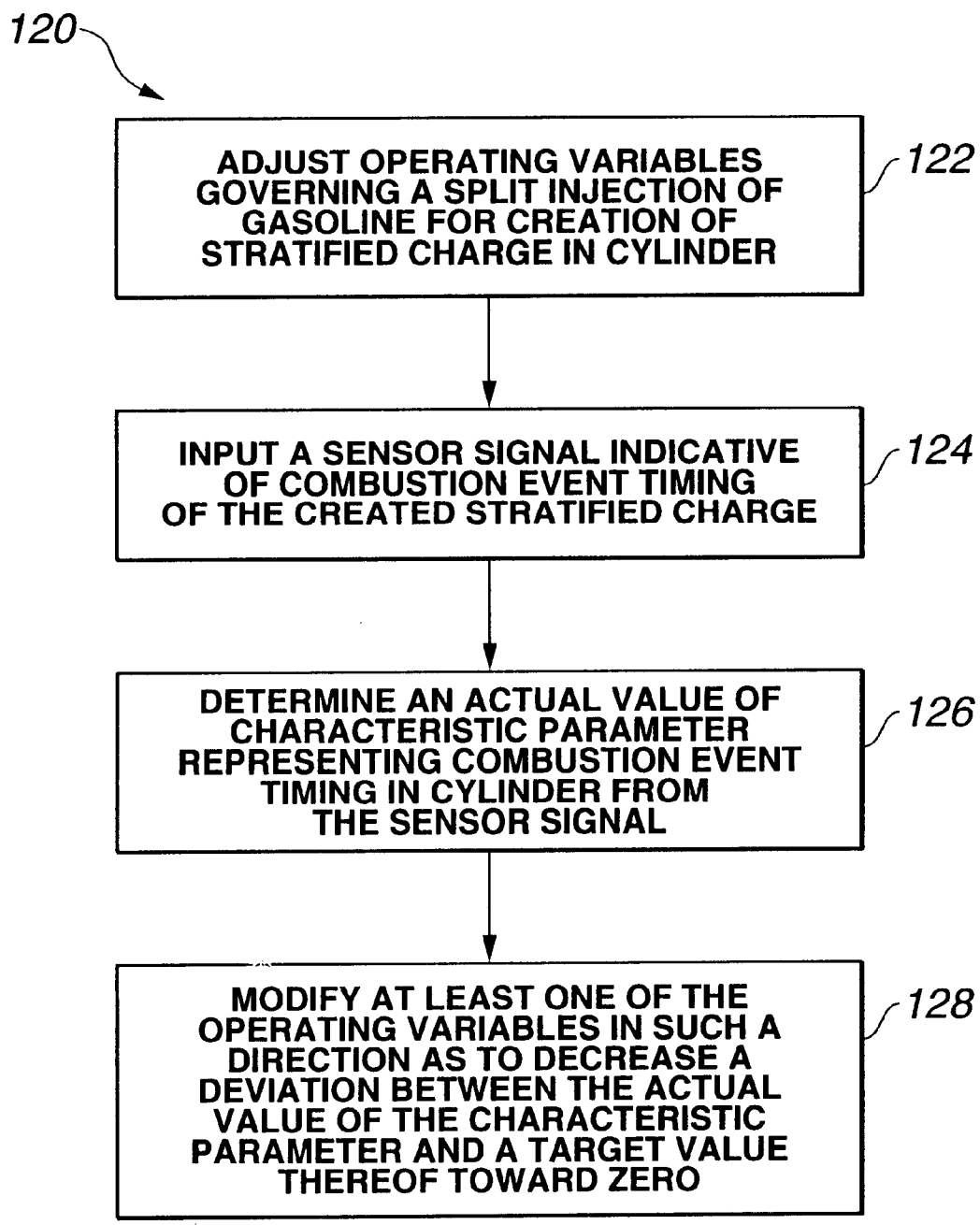
FIG. 16 is a block diagram illustrating a method of the present invention for controlling auto-ignition combustion of gasoline in cylinder.

With reference to FIG. 16, a method of the present invention for controlling auto-ignition combustion of gasoline in cylinder is generally designated at 120. At block 122, operating variables governing a split injection of gasoline are adjusted for creation of stratified charge in cylinder. At block 124, a sensor signal indicative of combustion event timing of the created stratified charge is input, At block 126, an actual value of characteristic parameter representing combustion event timing in cylinder is determined from the sensor signal. At block 128, at least one of the operating variables is modified in such a direction as to decrease a deviation between the actual value of the characteristic parameter and a target value thereof toward zero.

Figure 17:
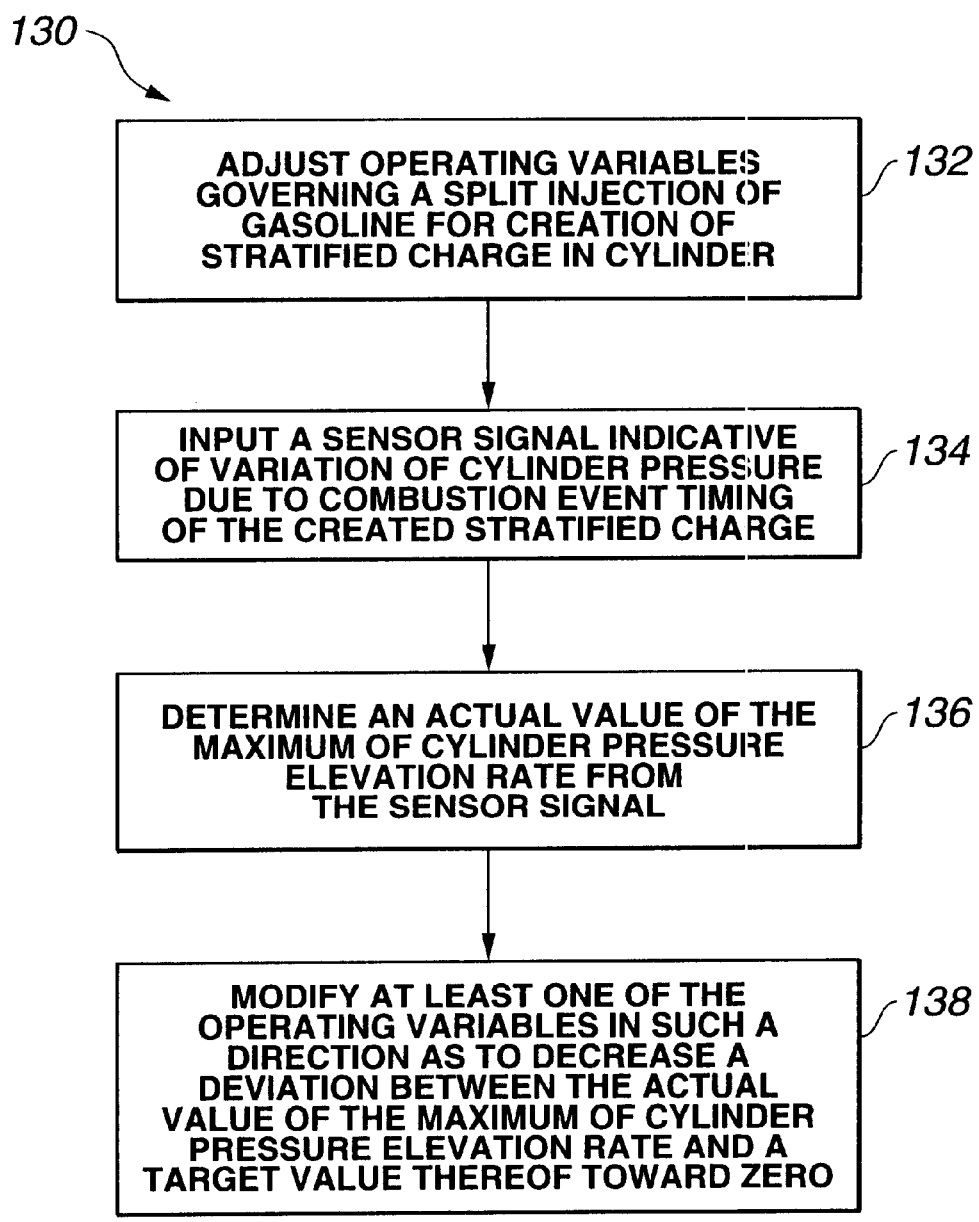
FIG. 17 is a block diagram illustrating a method of the present invention for controlling auto-ignition combustion of gasoline in cylinder.

With reference to FIG. 17, a method of the present invention for controlling auto-ignition combustion of gasoline in cylinder is generally designated at 130. At block 132, operating variables governing a split injection of gasoline are adjusted for creation of stratified charge in cylinder. At block 134, a sensor signal indicative of variation of cylinder pressure due to combustion event timing of the created stratified charge is input.

At block 136, an actual value of the maximum of cylinder pressure elevation rate $(dP/d\theta_{max})$ is determined from the is sensor signal At block 138, at least one of the operating variables is modified in such a direction as to decrease a deviation between the actual value of the maximum of cylinder pressure elevation rate and a target value thereof toward zero.

Figure 18:
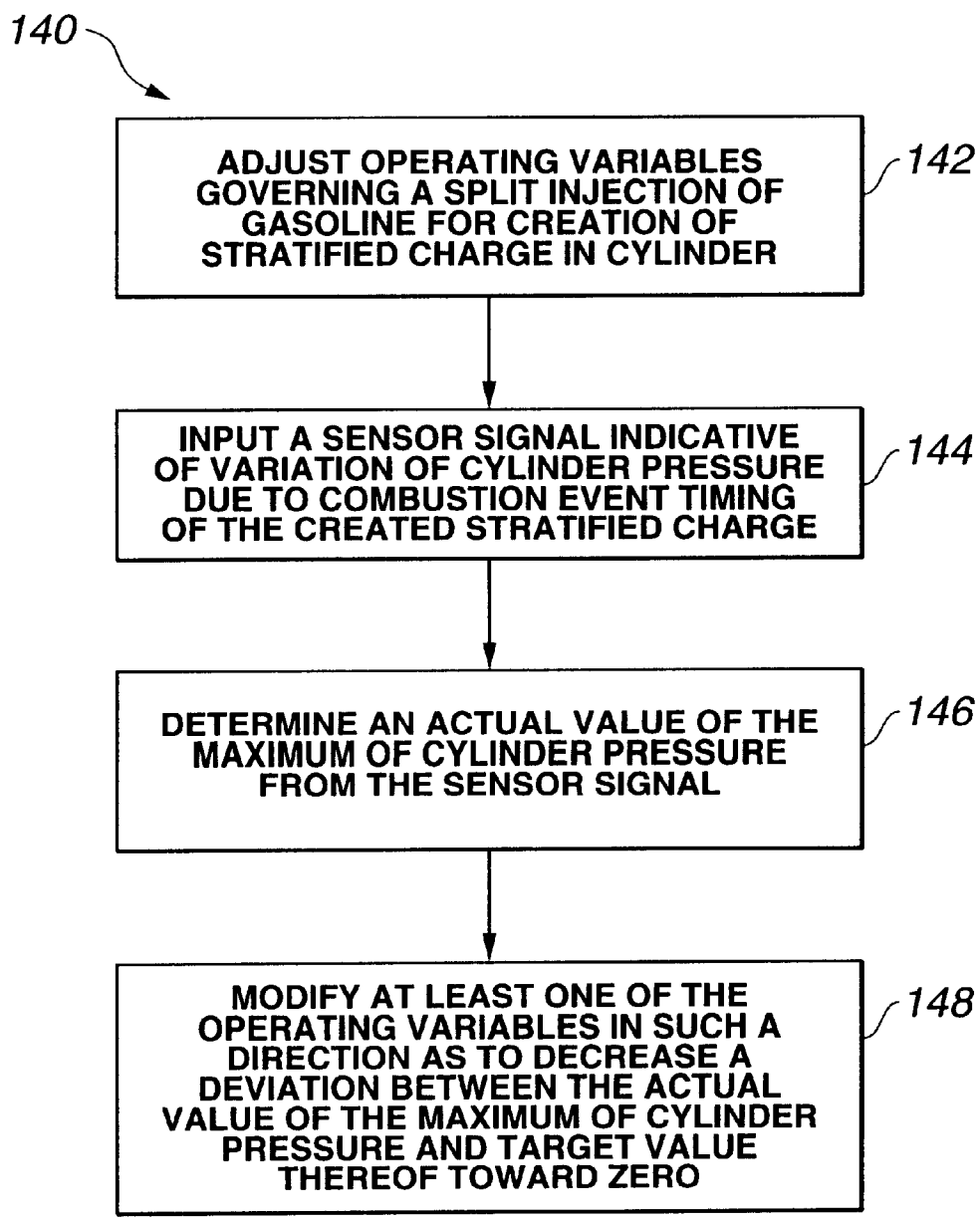
FIG. 18 is a block diagram illustrating a method of the present invention for controlling auto-ignition combustion of gasoline in cylinder.

With reference to FIG. 18, a method of the present invention for controlling auto-ignition combustion of gasoline in cylinder is generally designated at 140. At block 142, operating variables governing a split injection of gasoline are adjusted for creation of stratified charge in cylinder. At block 144, a sensor signal indicative of variation of cylinder pressure due to combustion event timing of the created stratified charge is input. At block 146, an actual value of the maximum of cylinder pressure $P_{max}$ is determined from the sensor signal. At block 148, at least one of the operating variables is modified in such a direction as to decrease a deviation between the actual value of the maximum of cylinder pressure and a target value thereof toward zero.

Figure 19:
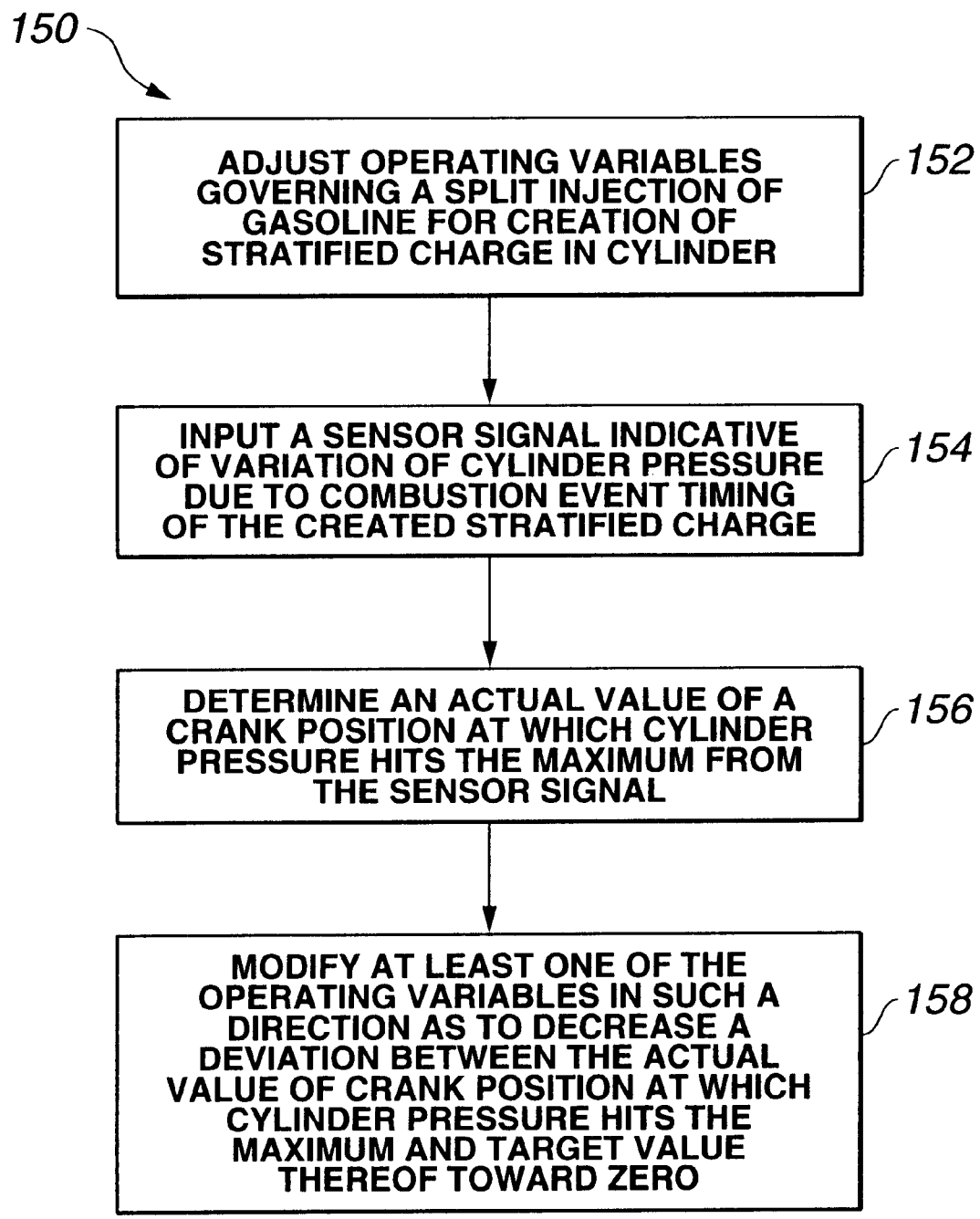
FIG. 19 is a block diagram illustrating a method of the present invention for controlling auto-ignition combustion of gasoline in cylinder.

With reference to FIG. 19, a method of the present invention for controlling auto-ignition combustion of gasoline in cylinder is generally designated at 150. At block 152, operating variables governing a split injection of gasoline are adjusted for creation of stratified charge in cylinder. At block 154, a sensor signal indicative of variation of cylinder pressure due to combustion event timing of the created stratified charge is input. At block 156, an actual value of a crank position at which cylinder pressure hits the maximum $(\theta P_{max})$ is determined from the sensor signal. At block 158, at least one of the operating variables is modified in such a direction as to decrease a deviation between the actual value of crank position at which cylinder pressure hits the maximum and a target value thereof toward zero.

Figure 20:
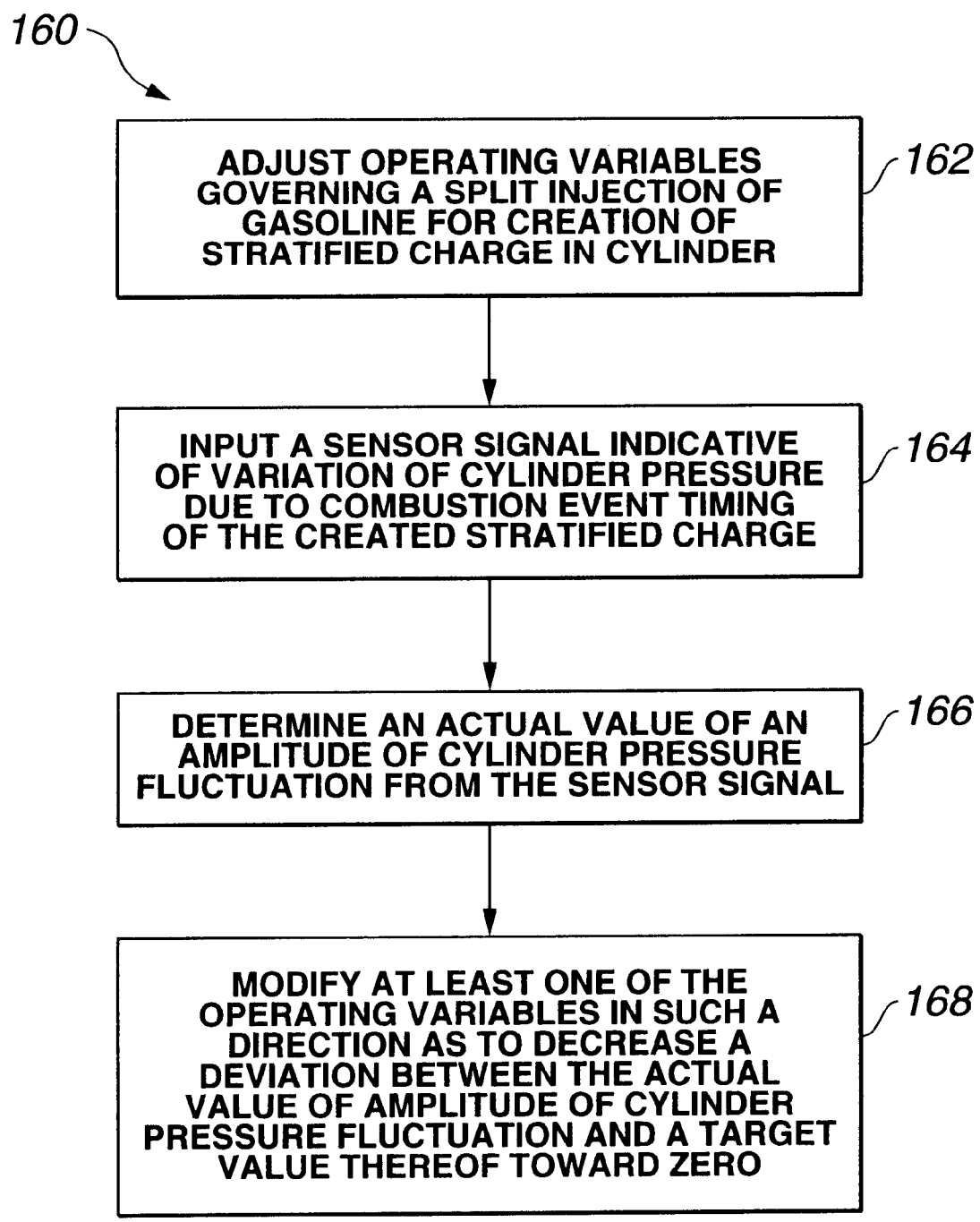
FIG. 20 is a block diagram illustrating a method of the present invention for controlling auto-ignition combustion of gasoline in cylinder.

With reference to FIG. 20, a method of the present invention for controlling auto-ignition combustion of gasoline in cylinder is generally designated at 160. At block 162, operating variables governing a split injection of gasoline are adjusted for creation of stratified charge in cylinder. At block 164, a sensor signal indicative of variation of cylinder pressure due to combustion event timing of the created stratified charge is input. At block 166, an actual value of amplitude of cylinder pressure fluctuation is determined from the sensor signal. At block 168, at least one of the operating variables is modified in such a direction as to decrease a deviation between the actual value of amplitude of cylinder pressure fluctuation and a target value thereof toward zero.

Figure 21:
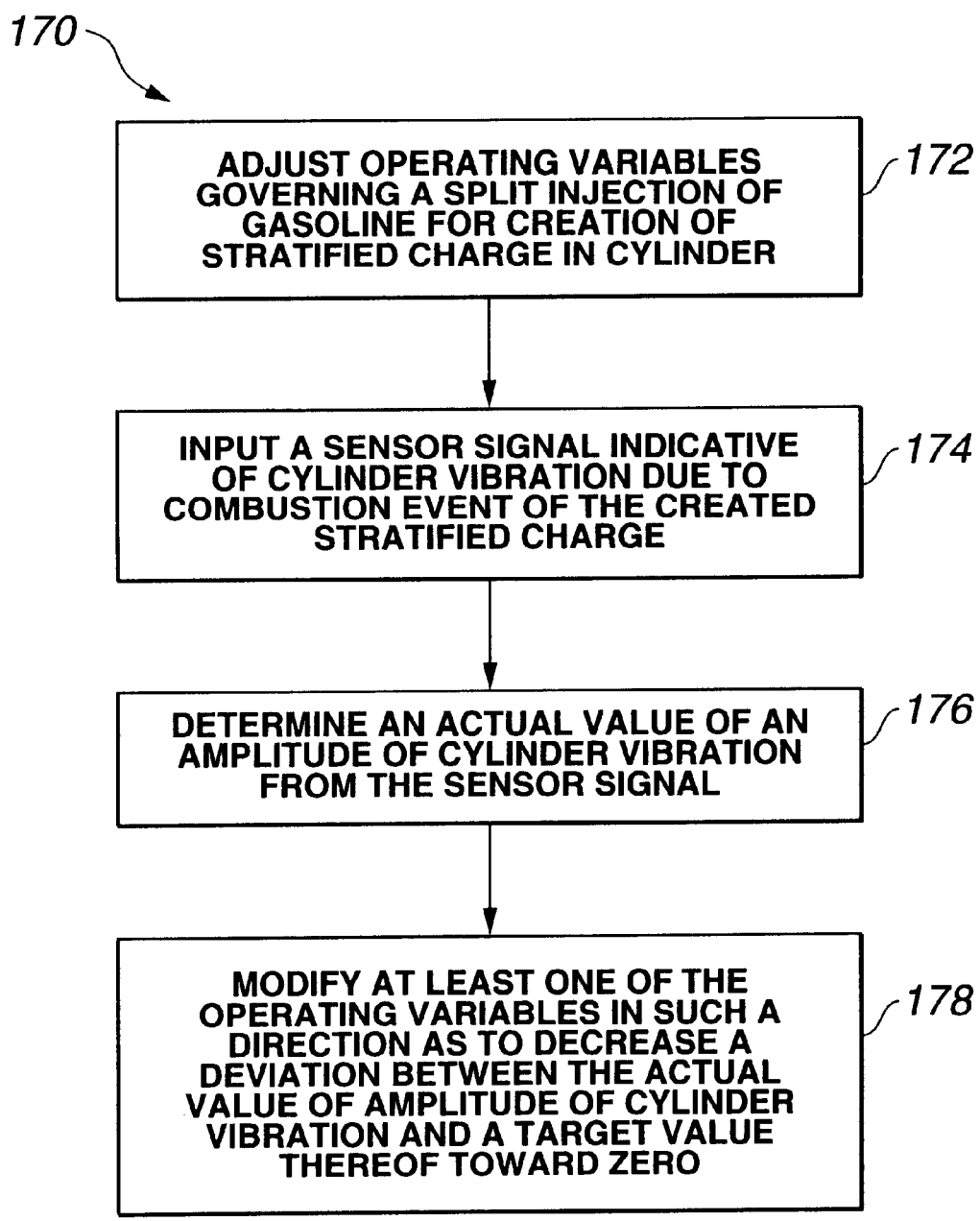
FIG. 21 is a block diagram illustrating a method of the present invention for controlling auto-ignition combustion of gasoline in cylinder.

With reference to FIG. 21, a method of the present invention for controlling auto-ignition combustion of gasoline in cylinder is generally designated at 170. At block 172, operating variables governing a split injection of gasoline are adjusted for creation of stratified charge in cylinder. At block 174, a sensor signal indicative of cylinder vibration due to combustion event timing of the created stratified charge is input. At block 176, an actual value of amplitude of cylinder vibration is determined from the sensor signal. At block 178, at least one of the operating variables is modified in such a direction as to decrease a deviation between the actual value of amplitude of cylinder vibration and a target value thereof toward zero.

Figure 22:
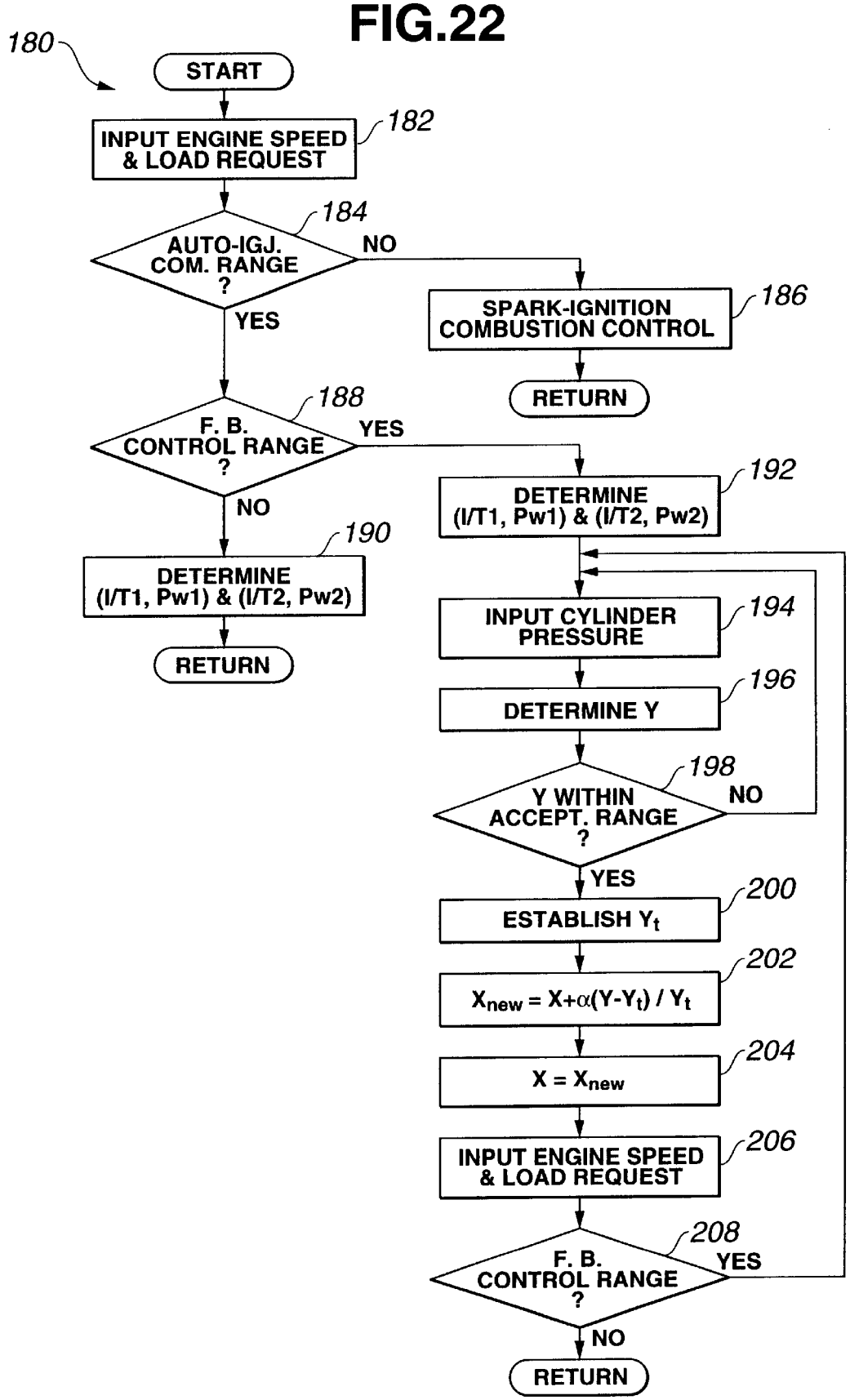
FIG. 22 is a flowchart of a control routine implementing the present invention.

With reference to FIGS. 3, 14, and 22, a method of the present invention for controlling auto-ignition combustion of gasoline in cylinder will be described. In FIG. 22, a control routine is generally indicated at 180. At step 182, engine speed and load request are input. At interrogation step 184, it is determined from the engine speed and load request whether or not the operating conditions allow auto-ignition combustion. In making this determination, a table look-up operation of combustion type map shown in FIG. 3 may be performed. If the operating conditions fall outside of auto-ignition combustion range, the control logic goes to step 186. At step 186, spark-ignition combustion control is carried out. If, at step 184, it is determined that the operating conditions fall in auto-ignition combustion range, control logic goes to another interrogation step 188. At step 188, it is determined whether or not operating conditions falls in feedback control range. In making this determination, the combustion type map shown in FIG. 3 may be referred using engine speed and load request. If operating conditions falls outside of feedback control range and thus fall in open control range section of auto-ignition combustion range, control logic goes from step 188 to step 190. At step 190, BOI_F I/T1, FPW_F Pw1, BOI_S I/T2, and SPW_S Pw2 are determined by performing table look-up operation of look-up table using engine speed and load request.

If, at step 188, it is determined that operating conditions fall in feedback control range section, control logic goes to step 192. At step 192, BOI_F I/T1, FPW_F Pw1, BOI_S I/T2, and SPW_S Pw2 are determined by performing table look-up operation of look-up table using engine speed and load request. At step 194, cylinder pressure is input from sensor signal of sensor 20 (see FIG. 14). At step 196, an actual value of characteristic parameter Y is determined from cylinder pressure. At interrogation step, it is determined whether or not the actual value of characteristic parameter Y stays in acceptable controllable range in view of a target value of characteristic parameter Yt. If this is not the case, control logic returns to step 194. If this is the case, control logic goes to step 200. At step 200, a target value of characteristic parameter Yt is determined by referring to look-up table using engine speed and load request. At steps 202 and 204, operating variable X is modified by calculating equations 1 and 2 involving as a deviation Y−Yt as a variable. At step 206, engine speed and load request are input. At step 208, it is determined whether operating condition falls in feedback control range section by referring to combustion type map shown in FIG. 3 using engine speed and load request.

Figure 23:
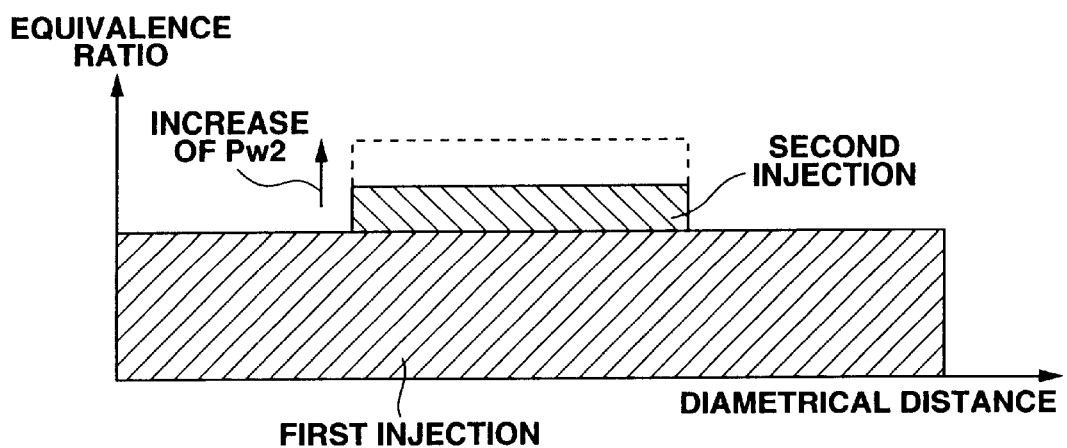
FIG. 23 is a graphical representation similar to FIG. 13, illustrating influence of modification of second pulse width Pw2 on A/F of relatively rich mixture in cylinder.

FIG. 23 is a graphical representation similar to FIG. 13, illustrating influence of modification of second pulse width Pw2 on A/F of relatively rich mixture in cylinder.

Figure 24:
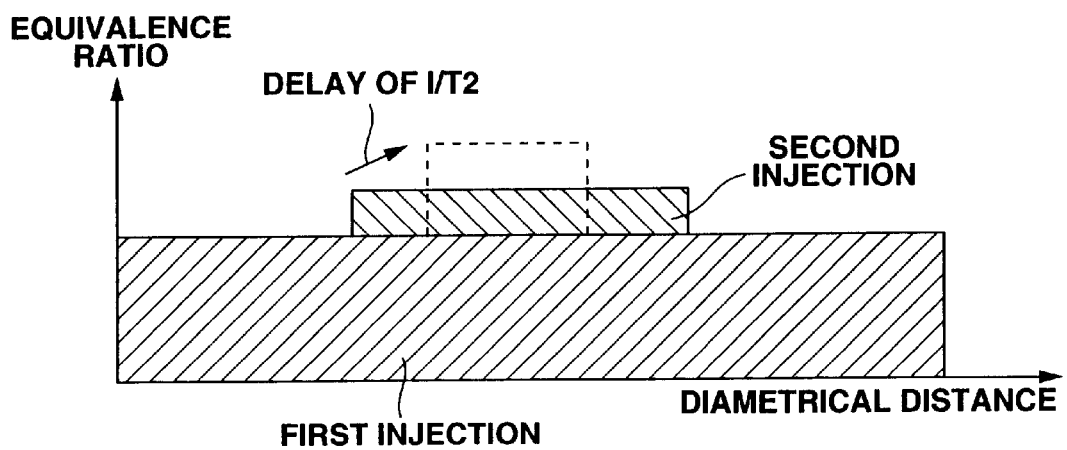
FIG. 24 is a graphical representation similar to FIG. 13, illustrating influence of modification of beginning of second injection I/T2 on A/F and volume of relatively rich mixture in cylinder.

FIG. 24 is a graphical representation similar to FIG. 13, illustrating influence of modification of beginning of second injection I/T2 on A/F and volume of relatively rich mixture in cylinder.

Figure 25:
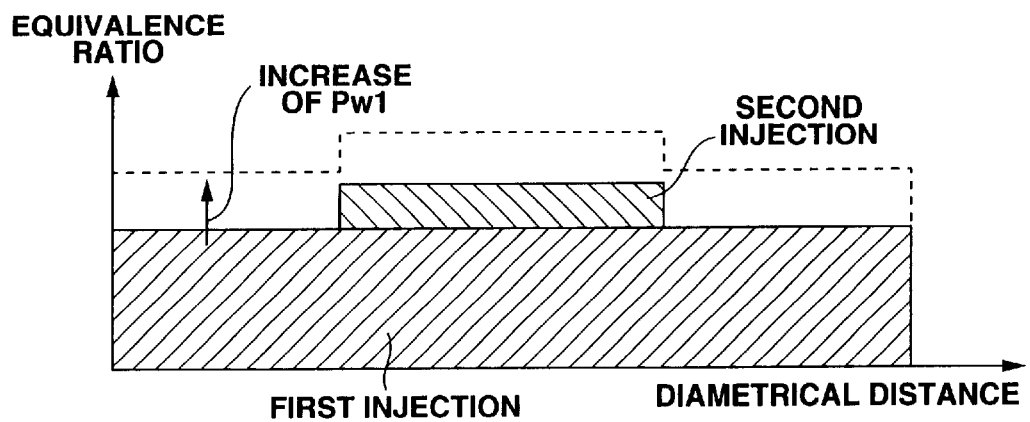
FIG. 25 is a graphical representation similar to FIG. 13, illustrating influence of modification of first pulse width Pw1 on A/F of relatively rich mixture and A/F of relatively lean mixture in cylinder.

FIG. 25 is a graphical representation similar to FIG. 13, illustrating influence of modification of first pulse width Pw1 on A/F of relatively rich mixture and A/F of relatively lean mixture in cylinder.

Figure 26:
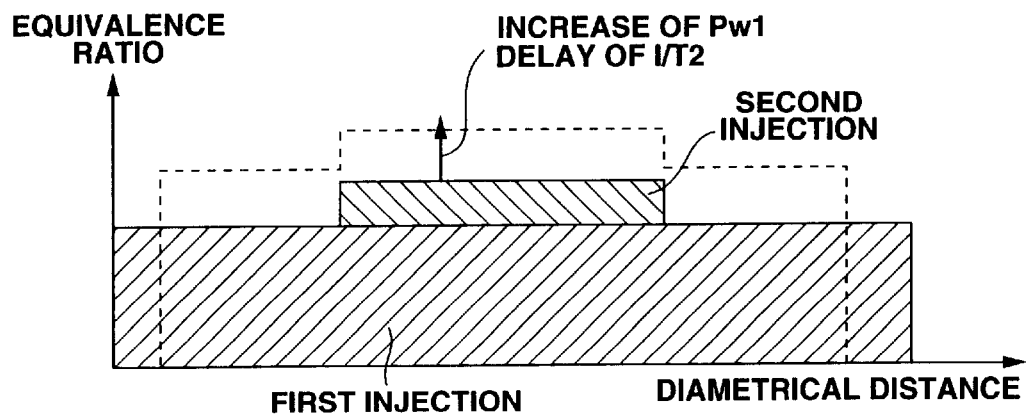
FIG. 26 is a graphical representation similar to FIG. 13, illustrating influence of modification of first pulse width Pw1 and modification of beginning of first injection I/T2 on A/F of relatively rich mixture and A/F and volume of relatively lean mixture in cylinder.

FIG. 26 is a graphical representation similar to FIG. 13, illustrating influence of modification of first pulse width Pw1 and modification of beginning of first injection I/T2 on A/F of relatively rich mixture and A/F and volume of relatively lean mixture in cylinder.

FIG. 27 is a table illustrating in what direction operating variables X are to be modified if characteristic parameter Y is greater than a target value (TARGET).

It is to be appreciated that if cyclic dispersion of engine torque poses a problem, the split ratio between FQ_F and FQ_S should be modified so that the total of fuel quantities is always determined as a predetermined function of load request on engine.

While the present invention has been particularly described, in conjunction with preferred implementations and embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. 2000-143850, filed May 16, 2000, the disclosure of which is hereby incorporated by reference in its entirety.

What is claimed is:

1. An auto-ignition type internal combustion engine, comprising:
    at least one cylinder;
    a fuel injection system performing injection of gasoline fuel for one cycle to create stratified charge in the cylinder;
    a sensor generating a sensor signal indicative of combustion event timing of the created stratified charge in the cylinder; and
    an engine controller determining an actual value of a characteristic parameter representing combustion event timing in the cylinder from the sensor signal, and modifying at least one operating variables governing injection for the subsequent cycle in such a direction as to decrease a deviation between the actual value of the characteristic and a target value thereof toward zero.

2. The auto-ignition type internal combustion engine as claimed in claim 1, wherein the injection is a split injection.

3. The auto-ignition type internal combustion engine as claimed in claimed in claim 2, wherein the split injection includes a first injection preceding to a second injection during a compression stroke of a prison located in the cylinder.

4. The auto-ignition type internal combustion engine as claimed in claim 3,
    wherein the sensor is a pressure sensor to detect cylinder pressure in the cylinder, and
    wherein the characteristic parameter is the maximum of cylinder pressure elevation rate.

5. The auto-ignition type internal combustion engine as claimed in claim 3,
    wherein the sensor is a pressure sensor to detect cylinder pressure in the cylinder, and
    wherein the characteristic parameter is the maximum of cylinder pressure.

6. The auto-ignition type internal combustion engine as claimed in claim 3,
    wherein the sensor is a pressure sensor to detect cylinder pressure in the cylinder, and
    wherein the characteristic parameter is a crank position at which cylinder pressure hits the maximum.

7. The auto-ignition type internal combustion engine as claimed in claim 3,
    wherein the sensor is a pressure sensor to detect cylinder pressure in the cylinder, and
    wherein the characteristic parameter is an amplitude of cylinder pressure fluctuation.

8. The auto-ignition type internal combustion engine as claimed in claim 3,
    wherein the sensor is a knock sensor, and
    wherein the characteristic parameter is an amplitude of cylinder vibration.

9. The auto-ignition type internal combustion engine as claimed in claim 3, wherein the operating variables include fuel quantity and timing for each of the first and second injections.

10. The auto-ignition type internal combustion engine as claimed in claim 3,
    wherein the operating variable is fuel quantity for the second injection, and
    wherein the engine controller allows the fuel quantity to undergo a reduction when the deviation between the actual value of the characteristic parameter and the target value thereof requests a retard of combustion event timing.

11. The auto-ignition type internal combustion engine as claimed in claim 3,
    wherein the operating variable is timing for the second injection, and
    wherein the engine controller allows the timing to undergo an advance when the deviation between the actual value of the characteristic parameter and the target value thereof requests a retard of combustion event timing.

12. The auto-ignition type internal combustion engine as claimed in claim 3,
    wherein the operating variable is fuel quantity for the first injection, and wherein the engine controller allows the fuel quantity to undergo a reduction when the deviation between the actual value of the characteristic parameter and the target value thereof requests a retard of combustion event timing.

13. The auto-ignition type internal combustion engine as claimed in claim 3,
wherein the operating variable is timing for the first injection, and
wherein the engine controller allows the timing to undergo an advance when the deviation between the actual value of the characteristic parameter and the target value thereof requests a retard of combustion event timing.

14. The auto-ignition type internal combustion engine as claimed in claim 3, wherein the engine controller determines the total of fuel quantities for the first and second fuel injections as a function of load on the engine.

15. A system for controlling an auto-ignition type internal combustion engine having at least one cylinder and a piston located in the cylinder, comprising:
a fuel injection system performing a split injection of gasoline fuel for one cycle to create stratified charge in the cylinder;
a sensor generating a sensor signal indicative of combustion event timing of the stratified charge; and
a controller determining an actual value of a characteristic parameter representing combustion event timing in the cylinder from the sensor signal, and modifying at least one operating variables governing a split injection for the subsequent cycle in such a direction as to decrease a deviation between the actual value of the characteristic parameter and a target value thereof toward zero.

16. A method for controlling an auto-ignition type internal combustion engine having at least one cylinder and a piston located in the cylinder, comprising:
performing a split injection of gasoline fuel for one cycle to create stratified charge in the cylinder;
generating a sensor signal indicative of combustion event timing of the stratified charge;
establishing a target value of a characteristic parameter representing combustion event timing in the cylinder;
determining an actual value of the characteristic parameter representing combustion event timing of the stratified charge from the sensor signal; and
modifying at least one operating variables governing a split injection for the subsequent cycle in such a direction as to decrease a deviation between the actual value of the characteristic parameter and the target value thereof toward zero.

17. A system for controlling an auto-ignition type internal combustion engine having at least one cylinder and a piston located in the cylinder, comprising:
means for performing a split injection of gasoline fuel for one cycle to create stratified charge in the cylinder;
means for generating a sensor signal indicative of combustion event timing of the stratified charge;
means for determining an actual value of a characteristic parameter representing combustion event timing in the cylinder from the sensor signal; and
means for modifying at least one operating variables governing a split injection for the subsequent cycle in such a direction as to decrease a deviation between the actual value of the characteristic parameter and a target value thereof toward zero.

18. A computer readable storage medium having stored therein data representing instructions executable by an engine controller to control an auto-ignition type internal combustion engine, the engine having at least one cylinder and a piston located in the cylinder, the computer readable storage medium comprising:
instructions for establishing a target value of a characteristic parameter representing combustion event timing in the cylinder;
determining an actual value of the characteristic parameter representing combustion event timing of stratified charge produced by a split injection for one cycle of gasoline into the cylinder; and
modifying at least one operating variables governing a split injection for the subsequent cycle in such a direction as to decrease a deviation between the actual value of the characteristic parameter and the target value thereof toward zero.

19. An auto-ignition type internal combustion engine, comprising:
at least one cylinder;
a reciprocating piston located in the cylinder;
a fuel injection system performing injection of gasoline fuel for one cycle to create stratified charge in the cylinder,
wherein the stratified charge created in the cylinder includes a rich air/gasoline mixture portion within a lean air/gasoline mixture remaining portion, the rich air/gasoline mixture being rich enough to burn by auto-ignition at an ignition point, causing temperature rise and pressure rise, which initiates auto-ignition of the lean air/gasoline mixture remaining portion;
a sensor generating a sensor signal indicative of combustion event of said created stratified charge in the cylinder; and
an engine controller determining an actual value of a start of combustion of the lean air/gasoline mixture remaining portion from the sensor signal, and modifying at least one operating variable governing injection for the subsequent cycle in such a direction as to decrease a deviation between the actual value of the start of combustion and a target value thereof toward zero.

20. The auto-ignition type internal combustion engine as claimed in claim 19, wherein the injection is a split injection, which includes a first injection preceding to a second injection during a compression stroke of the piston.

21. The auto-ignition type internal combustion engine as claimed in claim 20,
wherein the sensor is a pressure sensor to detect cylinder pressure in the cylinder, and
wherein the engine controller calculates one of the maximum of cylinder pressure and the maximum of cylinder pressure elevation rate in determining the actual value of the start of combustion of the lean air/gasoline mixture remaining portion.

22. The auto-ignition type internal combustion engine as claimed in claim 20,
wherein the sensor is a pressure sensor to detect cylinder pressure in the cylinder, and
wherein the engine controller determines a crank position at which the cylinder pressure hits the maximum as the actual value of the start of combustion of the lean air/gasoline mixture remaining portion.

23. The auto-ignition type internal combustion engine as claimed in claim 20, wherein the sensor is one of a pressure sensor to detect cylinder pressure in the cylinder and a knock sensor, and wherein the engine controller calculates an amplitude of cylinder vibration in determining the actual value of the start of combustion of the lean air/gasoline remaining portion.

24. An auto-ignition type internal combustion engine comprising:

at least one cylinder;

a reciprocating piston disposed in said cylinder to define a combustion chamber therein to perform an intake stroke, a compression stroke, an expansion stroke, and an exhaust stroke;

a fuel injection system including a fuel injector directly communicating with said combustion chamber for spraying gasoline fuel;

an engine controller providing a control arrangement such that said fuel injector sprays a first injection quantity of gasoline fuel into said combustion chamber at a first fuel injection timing, which falls in a range from the intake stroke to the first half of the compression stroke, thereby to form an air/fuel mixture cloud that becomes a body of mixture as said piston moves from said first fuel injection timing toward a top dead center position of the compression stroke, and such that said fuel injector sprays a second injection quantity of gasoline fuel into said body of mixture at a second fuel injection timing, which falls in the second half of the compression stroke, forming a mixture cloud that is superimposed on a portion of said body of mixture, thereby to establish the cylinder content wherein the density of fuel particles within said superimposed portion is high enough to burn by auto-ignition at an ignition point in the neighborhood of the piston top dead center position of the compression stroke, causing temperature rise and pressure rise, which initiate auto-ignition of the fuel particles within the remaining portion of said body of mixture; and a sensor generating a sensor signal indicative of a combustion event taking place in the cylinder, said engine controller determining an actual value of a start of combustion of the fuel particles within the remaining portion of said body of mixture from the sensor signal and modifying at least one of operating variables governing injection for the subsequent cycle in such a direction as to decrease a deviation between the actual value of the start of combustion and a target value thereof toward zero.

25. A system for controlling an auto-ignition type internal combustion engine having at least one cylinder and a reciprocating piston located in the cylinder, comprising:

a fuel injection system including a fuel injector directly communicating with said combustion chamber for spraying gasoline fuel;

an engine controller providing a control arrangement such that said fuel injector sprays a first injection quantity of gasoline fuel into said combustion chamber at first fuel injection timing, which falls in a range from the intake stroke to the first half of the compression stroke, thereby to form an air/fuel mixture cloud that becomes a body of mixture as said piston moves from said first fuel injection timing toward a top dead center position of the compression stroke, and such that said fuel injector sprays a second injection quantity of gasoline fuel into said body of mixture at second fuel injection timing, which falls in the second half of the compression stroke, forming a mixture cloud that is superimposed on a portion of said body of mixture, thereby to establish the cylinder content wherein the density of fuel particles within said superimposed portion is high enough to burn by auto-ignition at an ignition point in the neighborhood of the piston top dead center position of the compression stroke, causing temperature rise and pressure rise, which initiate auto-ignition of the fuel particles within the remaining portion of said body of mixture; and a sensor generating a sensor signal indicative of a combustion event taking place in the cylinder, wherein said engine controller determining an actual value of a start of combustion of the fuel particles within the remaining portion of said body of mixture from the sensor signal and modifying at least one of operating variables governing injection for the subsequent cycle in such a direction as to decrease a deviation between the actual value of the start of combustion and a target value thereof toward zero.

26. A method for controlling an auto-ignition type internal combustion engine having at least one cylinder and a reciprocating piston located in the cylinder, comprising:

performing a split injection of gasoline fuel for one cycle by:

spraying a first injection quantity of gasoline fuel into the combustion chamber at a first fuel injection timing, which falls in a range from the intake stroke to the first half of the compression stroke, thereby to form an air/fuel mixture cloud that becomes a body of mixture as said piston moves from said first fuel injection timing toward a top dead center position of the compression stroke, and spraying a second injection quantity of gasoline fuel into said body of mixture at a second fuel injection timing, which falls in the second half of the compression stroke, forming a mixture cloud that is superimposed on a portion of said body of mixture, thereby to establish the cylinder content wherein the density of fuel particles within said superimposed portion is high enough to burn by auto-ignition at an ignition point in the neighborhood of the piston top dead center position of the compression stroke, causing temperature rise and pressure rise, which initiate auto-ignition of the fuel particles within the remaining portion of said body of mixture;

generating a sensor signal indicative of a combustion event taking place in the cylinder;

determining an actual value of a start of combustion of the fuel particles within the remaining portion of said body of mixture from the sensor signal; and modifying at least one of operating variables governing injection for the subsequent cycle in such a direction as to decrease a deviation between the actual value of the start of combustion and a target value thereof toward zero.

27. A system for controlling an auto-ignition type internal combustion engine having at least one cylinder and a reciprocating piston located in the cylinder, comprising:

means for performing a split injection of gasoline fuel for one cycle by:

spraying a first injection quantity of gasoline fuel into the combustion chamber at a first fuel injection timing, which falls in a range from the intake stroke to the first half of the compression stroke, thereby to form air/fuel mixture cloud that becomes a body of mixture as said piston moves from said first fuel injection timing toward a top dead center position of the compression stroke, and spraying a second injection quantity of gasoline fuel into said body of mixture at a second fuel injection timing, which falls in the second half of the compression stroke, forming a mixture cloud that is superimposed on a portion of said body of mixture, thereby to establish the cylinder content wherein the density of fuel particles within said superimposed portion is high enough to burn by auto-ignition at an ignition point in the neighborhood of the piston top dead center position of the compression stroke, causing temperature rise and pressure rise, which initiate auto-ignition of the fuel particles within the remaining portion of said body of mixture;

means for generating a sensor signal indicative of a combustion event taking place in the cylinder;

means for determining an actual value of a start of combustion of the fuel particles within the remaining portion of said body of mixture from the sensor signal; and means for modifying at least one of operating variables governing injection for the subsequent cycle in such a direction as to decrease a deviation between the actual value of the start of combustion and a target value thereof toward zero.

* * * * *